United States Patent
Yano et al.

(10) Patent No.: US 9,451,556 B2
(45) Date of Patent: Sep. 20, 2016

(54) COMMUNICATION SYSTEM, COMMUNICATION TERMINAL, AND REFERENCE SIGNAL TRANSMISSION METHOD

(71) Applicant: FUJITSU LIMITED, Kawasaki-shi, Kanagawa (JP)

(72) Inventors: Tetsuya Yano, Yokohama (JP); Yoshihiro Kawasaki, Kawasaki (JP); Yoshiaki Ohta, Yokohama (JP); Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/070,474

(22) Filed: Mar. 15, 2016

(65) Prior Publication Data
US 2016/0198414 A1    Jul. 7, 2016

Related U.S. Application Data

(63) Continuation of application No. PCT/JP2013/079041, filed on Oct. 25, 2013.

(51) Int. Cl.
*H04B 7/00* (2006.01)
*H04W 52/24* (2009.01)
*H04W 52/38* (2009.01)
*H04W 52/14* (2009.01)

(52) U.S. Cl.
CPC ......... *H04W 52/242* (2013.01); *H04W 52/383* (2013.01); *H04W 52/143* (2013.01)

(58) Field of Classification Search
None
See application file for complete search history.

(56) References Cited

U.S. PATENT DOCUMENTS 6,650,906 B1 * 11/2003 Bousquet .............. H04W 52/24
370/318
6,718,165 B1 *  4/2004 Ha ....................... H03G 3/3042
455/127.2

(Continued)

FOREIGN PATENT DOCUMENTS

JP       2006-522533 A    9/2006
JP       2009-505595 A    2/2009

(Continued)

OTHER PUBLICATIONS

Fujitsu, "RRM for D2D communication", Agenda Item: 7.2.8.1.3, 3GPP TSG-RAN1 meeting #74bis, R1-134856, Guangzhou, China, Oct. 7-11, 2013.

(Continued)

*Primary Examiner* — Dominic Rego
(74) *Attorney, Agent, or Firm* — Myers Wolin, LLC

(57) ABSTRACT

A communication system includes a first communication terminal and a second communication terminal that performs direct communication with the first communication terminal. The first communication terminal controls transmission power of a second reference signal which is a partial reference signal among a plurality of reference signals so as to reach known transmission power, the plurality of reference signals being transmitted with first data and used for demodulating the first data, controls transmission power of a first reference signal which is another reference signal other than the second reference signal among the plurality of reference signals so as to reach transmission power linked to transmission power of the first data, and transmits the plurality of reference signals subjected to transmission power control to the second communication terminal.

8 Claims, 25 Drawing Sheets

(56) References Cited

U.S. PATENT DOCUMENTS

| | | | |
|---|---|---|---|
| 9,379,799 B2* | 6/2016 | Nammi | H04W 52/325 |
| 2004/0166886 A1* | 8/2004 | Laroia | H04B 7/0491 |
| | | | 455/522 |
| 2006/0153105 A1 | 7/2006 | Jia et al. | |
| 2007/0042784 A1 | 2/2007 | Anderson | |
| 2008/0013500 A1* | 1/2008 | Laroia | H04B 7/2621 |
| | | | 370/338 |
| 2009/0046800 A1* | 2/2009 | Xu | H04B 7/0617 |
| | | | 375/267 |
| 2010/0110999 A1 | 5/2010 | Li et al. | |
| 2010/0150000 A1* | 6/2010 | Sakata | H04L 5/0007 |
| | | | 370/252 |
| 2011/0003559 A1 | 1/2011 | Morita et al. | |
| 2011/0170431 A1 | 7/2011 | Palanki et al. | |
| 2014/0120934 A1 | 5/2014 | Kishiyama | |

FOREIGN PATENT DOCUMENTS

| | | |
|---|---|---|
| JP | 2012-507975 A | 3/2012 |
| JP | 2013-500631 A | 1/2013 |
| JP | 2013-34165 A | 2/2013 |
| WO | 2009/122778 A1 | 10/2009 |

OTHER PUBLICATIONS

Alcatel-Lucent Shanghai Bell et al., "Consideration of Interference Mitigation for D2D Communication", Agenda Item: 7.2.8, 3GPP TSG-RAN1 Meeting #74, R1-132993, Barcelona, Spain, Aug. 19-23, 2013.

Kddi, "Views on D2D communication", Agenda Item: 7.2.8.1, 3GPP TSG RAN WG1 Meeting #74, R1-133311, Barcelona, Spain, Aug. 19-23, 2013.

Alcatel-Lucent Shanghai Bell et al., "Consideration of Resource Used and Power Setting for D2D communication", Agenda Item: 6.2.7, 3GPP TSG-RAN1 Meeting #73, R1-132069, Fukuoka, Japan, May 20-24, 2013.

Samsung, "Evaluation on WAN Impact of D2D discovery", Agenda Item: 7.2.8.2.3, 3GPP TSG-RAN1 meeting #74bis, R1-134191, Guangzhou, China, Oct. 7-11, 2013.

International Search Report issued for corresponding International Patent Application No. PCT/JP2013/079041, mailed Jan. 14, 2014, with an English translation.

* cited by examiner

FIG.5

| FORMAT | CONTROL INFORMATION |
|---|---|
| 1 | Positive SR |
| 1a | 1-bit HARQ-ACK OR 1-bit HARQ-ACK+positive SR |
| 1b | 2-bit HARQ-ACK OR 2-bit HARQ-ACK+positive SR |
| 2 | CSI |
| 2a | CSI+1-bit HARQ-ACK |
| 2b | CSI+2-bit HARQ-ACK |
| 3 | 10-bit HARQ-ACK (FOR FDD), 20-bit HARQ-ACK (FOR TDD) |

FIG.6

| FORMAT | NUMBER OF RS SYMBOLS [symbols/slot] | RS SYMBOL NUMBER |
|---|---|---|
| 1/1a/1b | 3 | 2, 3, 4 |
| 2/2a/2b/3 | 2 | 1, 5 |

COMMUNICATION SYSTEM, COMMUNICATION TERMINAL, AND REFERENCE SIGNAL TRANSMISSION METHOD

CROSS-REFERENCE TO RELATED APPLICATION

This application is a continuation of International Application No. PCT/JP2013/079041, filed on Oct. 25, 2013, the entire contents of which are incorporated herein by reference.

FIELD

The embodiments discussed herein are related to a communication system and a communication terminal.

BACKGROUND

In recent years, in wireless communication systems, such as mobile phone systems (cellular systems), the next-generation wireless communication technology is being discussed in order to implement wireless communication at higher speed and with higher capacity, more sophisticated functions, and the like.

For example, in standardization of the 3rd Generation Partnership Project Long Term Evolution (3GPP LTE), device-to-device (D2D) communication has been studied in which neighboring communication terminals directly communicate with each other without a base station, in order to reduce the traffic volume between the base station and the communication terminals. In this study, it is assumed that the D2D communication is performed by using an uplink resource, that is, uplink spectrum in Frequency Division Duplex (FDD) or an uplink subframe in Time Division Duplex (TDD).

Furthermore, as a conventional technology for the D2D communication, a technology has been proposed in which one of communication terminals measures path loss between the communication terminals by using a synchronization signal transmitted from the other one of the communication terminals, and determines transmission power of a response signal to be transmitted to the other one of the communication terminals on the basis of the measured path loss.

Examples of related-art are described in Japanese Laid-open Patent Publication No. 2013-034165, in Japanese National Publication of International Patent Application No. 2012-507975, in Japanese National Publication of International Patent Application No. 2006-522533, and in Patent Literature 4: International Publication Pamphlet No. 2009/122778.

However, the synchronization signal is transmitted only before the D2D communication starts. Therefore, in the conventional technology as described above, after the D2D communication has started, it is difficult to control the transmission power in accordance with a change in the path loss between the communication terminals due to movement or the like of the communication terminals during the D2D communication.

Furthermore, not all of the communication terminals transmit synchronization signals. Therefore, in some cases, estimation of path loss using a synchronization signal may be difficult.

Meanwhile, if a synchronization signal is periodically transmitted during the D2D communication in order to control the transmission power in accordance with a change in the path loss, a new communication resource to transmit the synchronization signal is needed and overhead increases.

SUMMARY

According to an aspect of an embodiment, a communication system includes a first communication terminal and a second communication terminal that performs direct communication with the first communication terminal. The first communication terminal controls transmission power of a second reference signal which is a partial reference signal among a plurality of reference signals so as to reach known transmission power, the plurality of reference signals being transmitted with first data and used for demodulating the first data, controls transmission power of a first reference signal which is another reference signal other than the second reference signal among the plurality of reference signals so as to reach transmission power linked to transmission power of the first data, and transmits the plurality of reference signals subjected to transmission power control to the second communication terminal. The second communication terminal receives the plurality of reference signals, estimates path loss between the first communication terminal and the second communication terminal by using the second reference signal among the plurality of reference signals, controls transmission power of second data based on the path loss, and transmits the second data subjected to transmission power control to the first communication terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of formats of the PUCCH of the first embodiment;

FIG. 6 is a diagram illustrating a correspondence relationship between the format of the PUCCH and a symbol of a DM_RS in the first embodiment;

DESCRIPTION OF EMBODIMENTS

Preferred embodiments of the present invention will be explained with reference to accompanying drawings. The communication system and the communication terminal disclosed in this application are not limited by the embodiments. In the embodiments, components with the same functions and Steps for the same processes are denoted by the same symbols, and the same explanation will not be repeated.

[a] First Embodiment

Configuration of a Communication System

Figure 1:
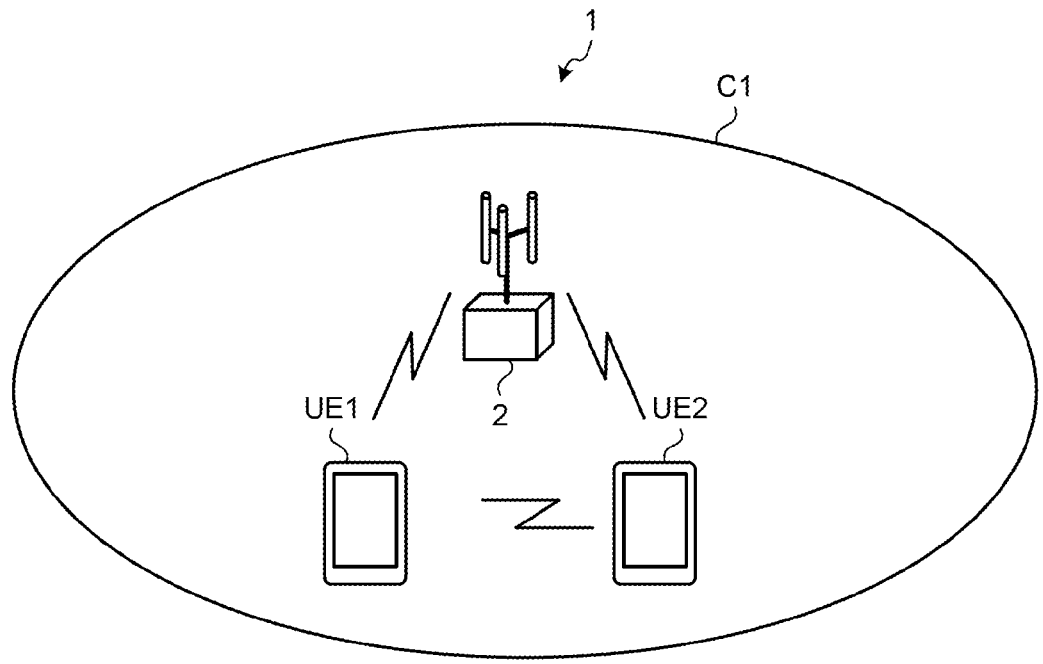
FIG. 1 is a diagram illustrating an example of a configuration of a communication system of a first embodiment.

FIG. 1 is a diagram illustrating an example of a configuration of a communication system of a first embodiment. In FIG. 1, a communication system 1 includes a base station 2 connected to a network (not illustrated), a communication terminal User Equipment (UE) 1, and a communication terminal UE 2. The communication terminal UE1 and the communication terminal UE2 can directly communicate with each other without the base station 2, that is, they can perform D2D communication. The base station 2 forms a cell C1. When both of the communication terminal UE1 and the communication terminal UE2 are located in the cell C1, the base station 2 exchanges various kinds of control information with the communication terminals UE1 and UE2 to perform the D2D communication. The communication terminal UE1 and the communication terminal UE2 start the D2D communication in accordance with an instruction from the base station 2.

Operation of the Communication System

As described above, in the 3GPP LTE standard, it is assumed to perform the D2D communication by using an uplink resource. Therefore, in the embodiment, the D2D communication is performed by using the same format as a Physical uplink Shared Channel (PUSCH) and the same format as a Physical Uplink Control Channel (PUCCH) defined in the 3GPP LTE standard specification. The same format as the PUSCH is used as a data channel for the D2D communication, and the same format as the PUCCH is used as a control channel for the D2D communication. In the 3GPP LTE, a Single-Carrier Frequency-Division Multiple Access (SC-FDMA) system is employed as a communication system. In the following, operation of the communication system 1 will be described for a case where path loss between the communication terminals is estimated by using the same format as the PUSCH, and for a case where path loss between the communication terminals is estimated by using the same format as the PUCCH.

Estimation of Path Loss Using the Same Format as the PUSCH

In the following, the same format as the PUSCH may be simply described as the PUSCH.

Figure 2:
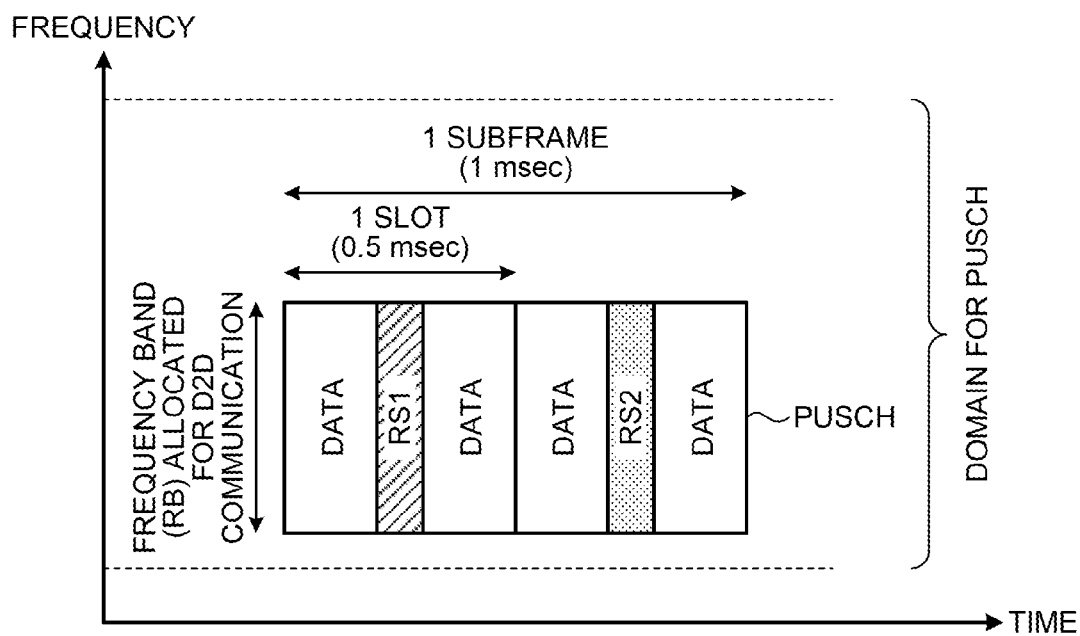
FIG. 2 is a diagram illustrating an example of a resource block of a PUSCH of the first embodiment.

FIG. 2 is a diagram illustrating an example of a resource block of the PUSCH of the first embodiment. As illustrated in FIG. 2, a frequency band for the D2D communication (that is, a resource block (RB)) is allocated to a part of a frequency band serving as a domain for the PUSCH. In addition, in the current LTE standard specification, one subframe of the PUSCH includes two slots as illustrated in FIG. 2, and each of first and second slots includes data (for example, user data or control data) and a reference signal for data demodulation. In the following, the "reference signal for data demodulation" may be described as a "DM_RS (demodulation reference signal)". Specifically, the first slot includes data and an RS1 that is a DM_RS for demodulating the data in the first slot, and the second slot includes data and an RS2 that is a DM_RS for demodulating the data in the second slot. That is, each of the first slot and the second slot includes one DM_RS, and the two DM_RSs are transmitted by an RB allocated to the PUSCH in accordance with the data in the subframe. Meanwhile, the length of one subframe is 1 millisecond (msec), and the length of one slot is 0.5 msec, for example.

Figure 3:
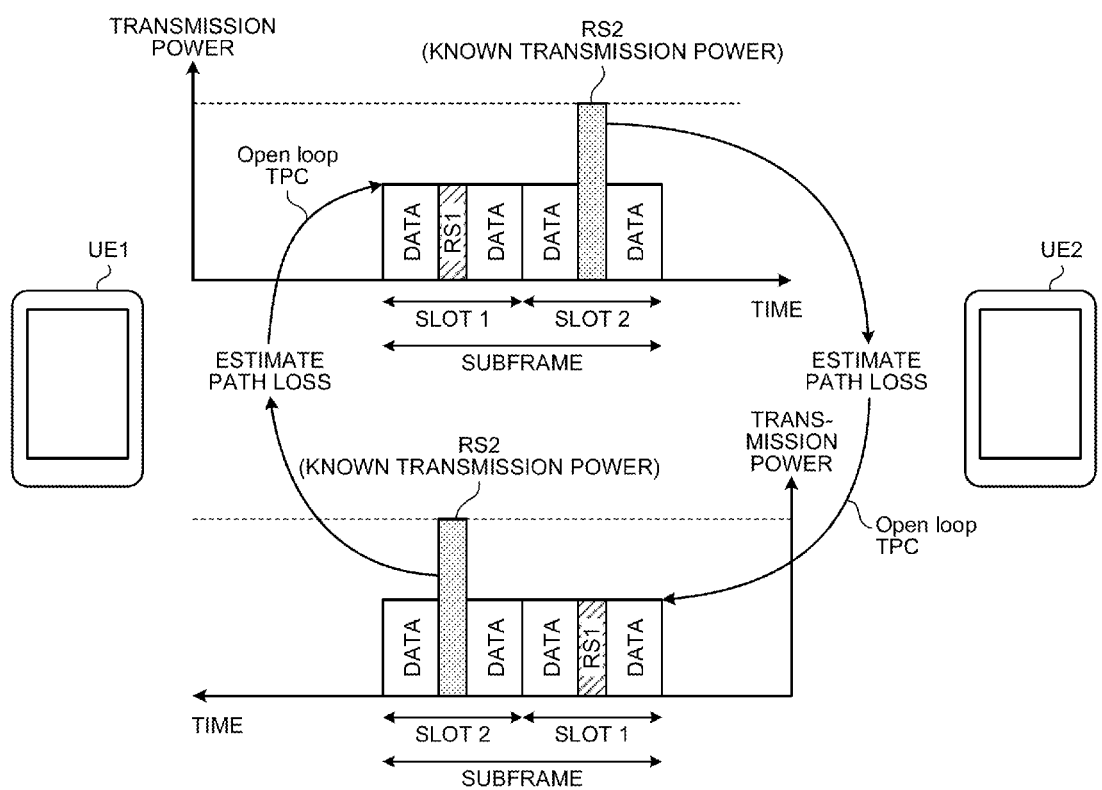
FIG. 3 is a diagram for explaining operation of the communication system when the PUSCH of the first embodiment is used.

The communication terminals UE1 and UE2 performing the D2D communication control transmission power of the RS1 between the RS1 and the RS2 included in the respective two slots of one subframe of the PUSCH so as to reach transmission power linked to transmission power of the data in the subframe as illustrated in FIG. 3. Furthermore, the communication terminals UE1 and UE2 performing the D2D communication control transmission power of the RS2 so as to reach transmission power known by both of the communication terminals UE1 and UE2. FIG. 3 is a diagram for explaining operation of the communication system when the PUSCH of the first embodiment is used.

For example, the communication terminal UE1 transmits the RS1 included in a slot 1 to the communication terminal UE2 by using the same transmission power as the transmission power of the data, and transmits the RS2 included in a slot 2 to the communication terminal UE2 by using the known transmission power.

The communication terminal UE2 receives the data, the RS1, and the RS2 transmitted from the communication terminal UE1. The communication terminal UE2 already knows the transmission power of the received RS2 from the communication terminal UE1, and therefore estimates path loss (propagation loss) between the communication terminal UE1 and the own terminal by using the RS2. Specifically, the communication terminal UE2 estimates greater path loss with an increase in a difference between the known transmission power of the RS2 and reception power of the RS2. Furthermore, the communication terminal UE2 controls transmission power of data to be transmitted to the communication terminal UE1 on the basis of the estimated path loss. Specifically, the communication terminal UE2 increases the transmission power of the data to be transmitted from the communication terminal UE2 with an increase in the estimated path loss. That is, the communication terminal UE2 performs open-loop Transmission Power Control (TPC). Then, the communication terminal UE2 transmits the data subjected to the transmission power control to the communication terminal UE1. In this case, similarly to the communication terminal UE1, the communication terminal UE2 transmits the RS1 to the communication terminal UE1 by using the same transmission power as the transmission power of the data, and transmits the RS2 to the communication terminal UE1 by using the known transmission power.

Thereafter, the communication terminal UE1 performs the transmission power control similarly to the communication terminal UE2, and the communication terminal UE1 and the communication terminal UE2 repeat transmission and reception of the RS1, the RS2, and the data and the transmission power control on the data and the RS1 by using the RS2 during the D2D communication.

In FIG. 3, an example is illustrated in which the slot 1 includes the DM_RS (i.e., the RS1) that is controlled so as to reach the transmission power linked to the transmission power of the data, and the slot 2 includes the DM_RS (that is, the RS2) that is controlled so as to reach the known transmission power. However, it may be possible to include, in the slot 1, the DM_RS (that is, the RS2) that is controlled so as to reach the known transmission power, and include, in the slot 2, the DM_RS (i.e., the RS1) that is controlled so as to reach the transmission power linked to the transmission power of the data.

Estimation of Path Loss Using the Same Format as the PUCCH

In the following, the same format as the PUCCH may be simply described as the PUCCH.

Figure 4:
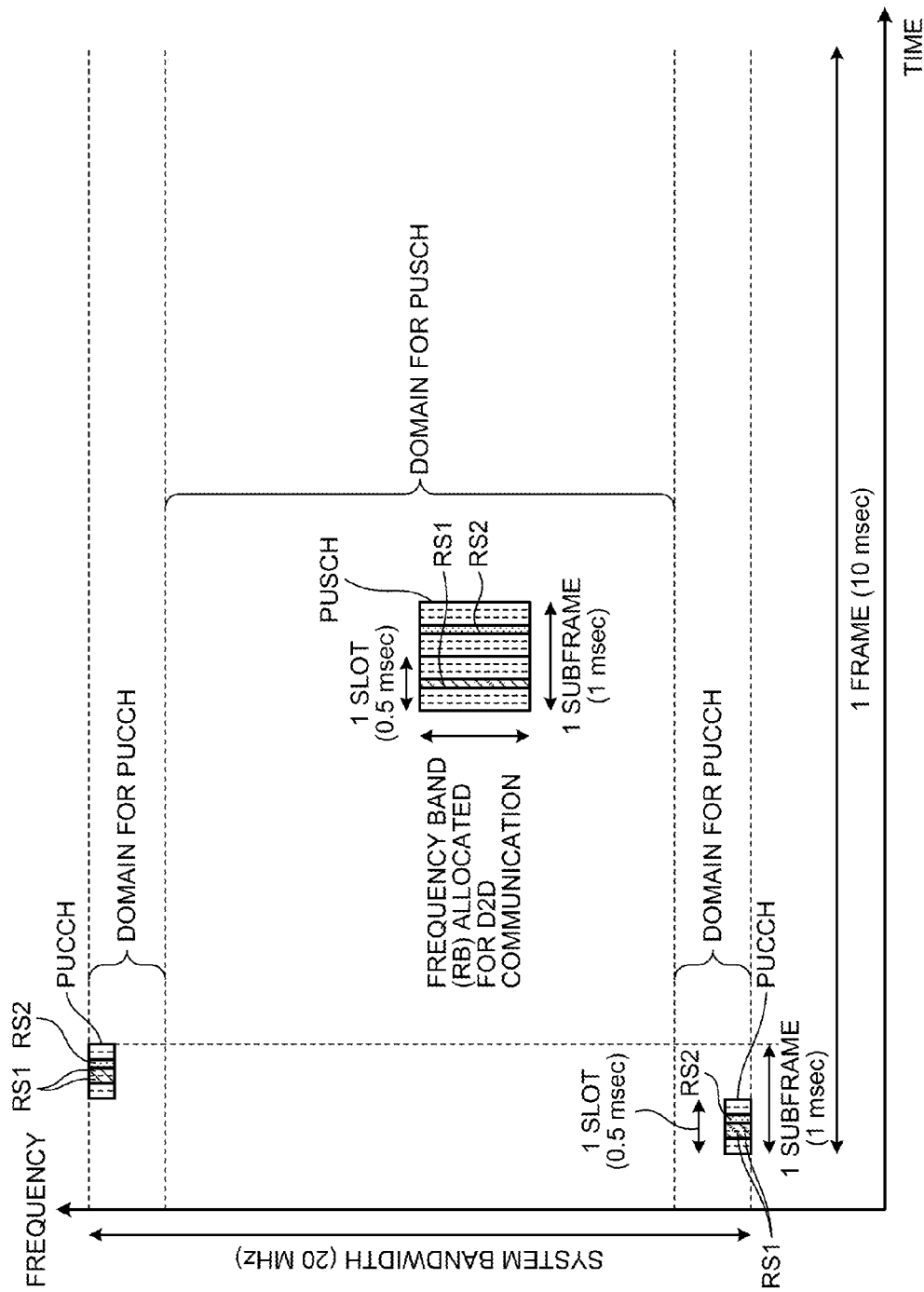
FIG. 4 is a diagram illustrating an example of a resource block of the PUCCH of the first embodiment.

FIG. 4 is a diagram illustrating an example of a resource block of the PUCCH of the first embodiment. As illustrated in FIG. 4, a domain for the PUCCH is located at both ends of a system band with a bandwidth of, for example, 20 megahertz (MHz), and the resource block of the PUCCH is allocated to a part of the domains of the PUCCH. In addition, in the current LTE standard specification, one subframe of the PUCCH includes two slots as illustrated in FIG. 4. The first slot includes data (for example, control data) and includes an RS1 and an RS2 that are DM_RSs for demodulating the data in the first slot. Similarly, the second slot includes data and includes an RS1 and an RS2 that are DM_RSs for demodulating the data in the second slot. That is, each of the first slot and the second slot includes a plurality of the DM_RSs, and the DM_RSs are transmitted in accordance with the data in the subframe. Meanwhile, the length of one frame is 10 msec, for example.

Incidentally, a plurality of formats are defined for the PUCCH. FIG. 5 is a diagram illustrating an example of the formats of the PUCCH of the first embodiment. For example, in the LTE standard specification, seven formats such as 1, 1a, 1b, 2, 2a, 2b, and 3 are defined as the formats of the PUCCH. Furthermore, with the PUCCH, uplink control information, such as a Scheduling Request (SR), HARQ-ACK, or Channel State Information (CSI), is transmitted. FIG. 5 illustrates a main correspondence relationship between each of the formats of the PUCCH and the uplink control information transmitted with each of the formats.

Furthermore, FIG. 6 illustrates a correspondence relationship between the formats of the PUCCH and symbols of the DM_RS. For example, if the format of the PUCCH is 1, 1a, or 1b, one slot includes three symbols of the DM_RS, where the symbol numbers are 2, 3, and 4.

Figure 7:
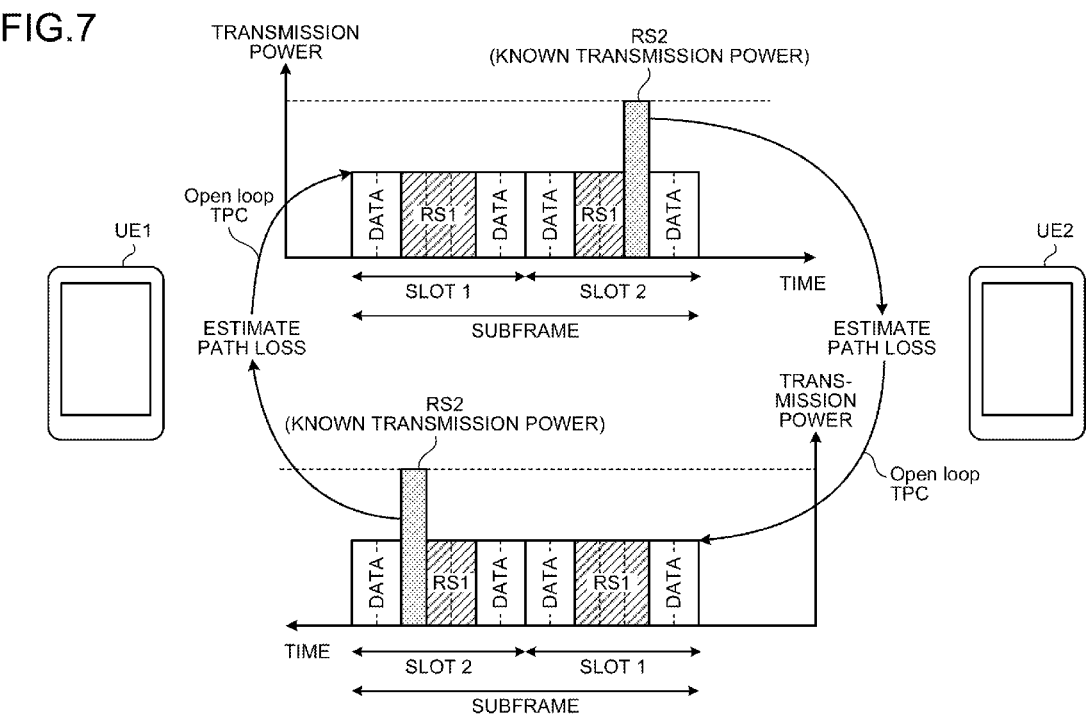
FIG. 7 is a diagram for explaining operation of the communication system when the PUCCH of the first embodiment is used.
Figure 8:
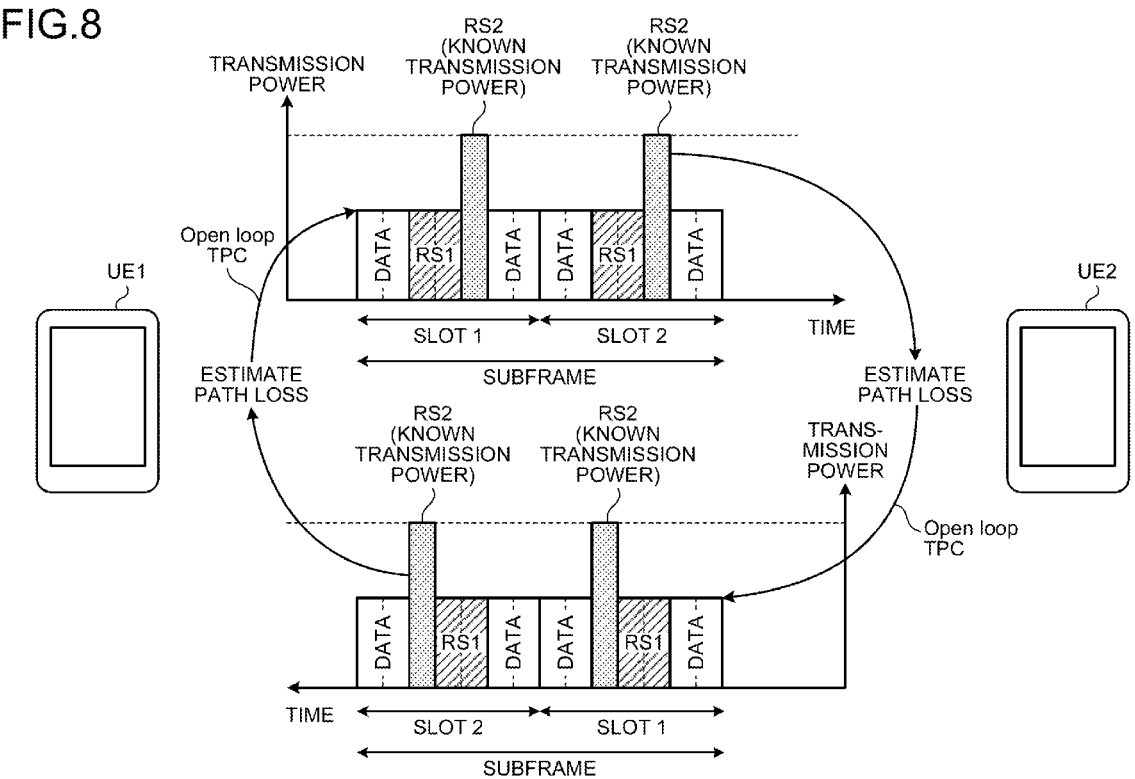
FIG. 8 is a diagram for explaining operation of the communication system when the PUCCH of the first embodiment is used.
Figure 9:
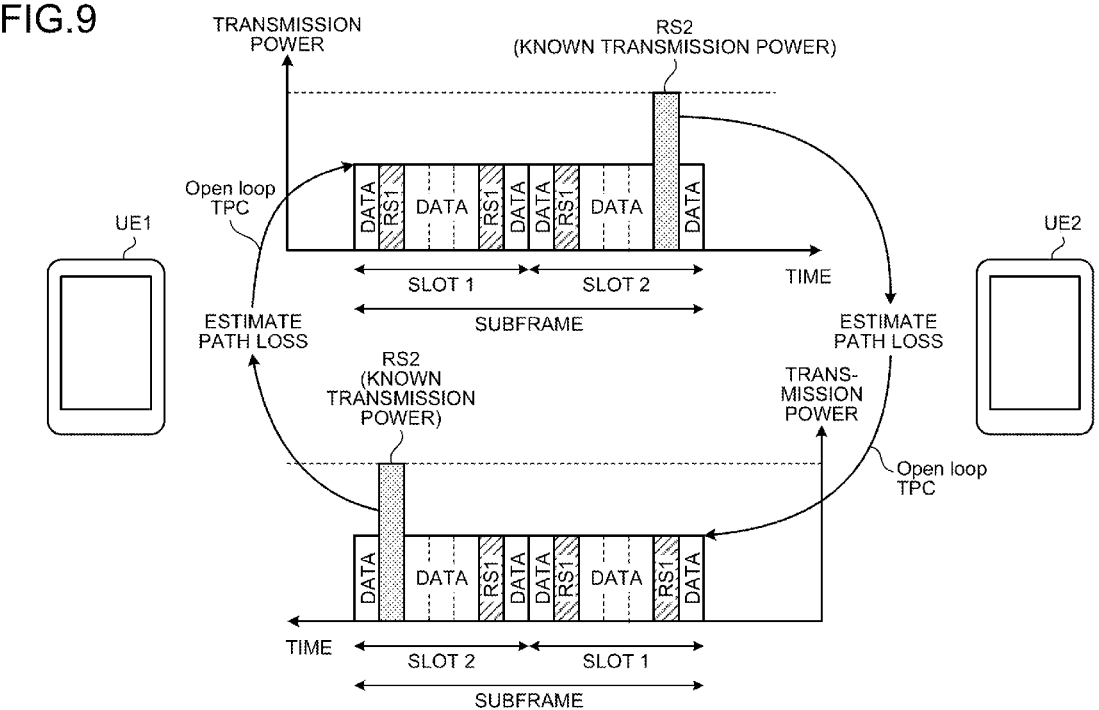
FIG. 9 is a diagram for explaining operation of the communication system when the PUCCH of the first embodiment is used.
Figure 10:
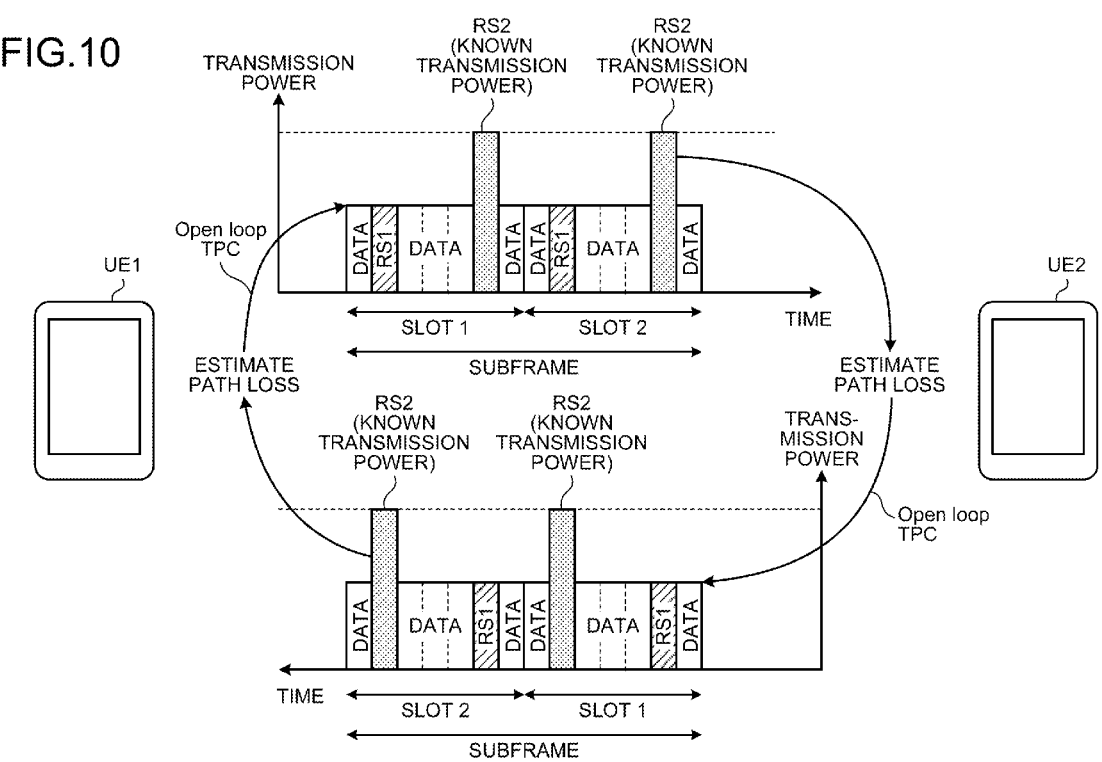
FIG. 10 is a diagram for explaining operation of the communication system when the PUCCH of the first embodiment is used.

The communication terminals UE1 and UE2 that perform the D2D communication by using the PUCCH with the formats as described above performs transmission power control as described below during the D2D communication. Specifically, the communication terminals UE1 and UE2 performing the D2D communication control transmission power of the RS1 between the RS1 and the RS2 included in the two slots of one subframe of the PUCCH so as to reach transmission power linked to transmission power of the data in the subframe as illustrated in FIG. 7 to FIG. 10. Furthermore, the communication terminals UE1 and UE2 performing the D2D communication control transmission power of the RS2 so as to reach transmission power known by both of the communication terminals UE1 and UE2. FIG. 7 to FIG. 10 are diagrams for explaining operation of the communication system when the PUCCH of the first embodiment is used. FIG. 7 illustrates a first control example in which the format of the PUCCH is 1, 1a, or 1b. FIG. 8 illustrates a second control example in which the format of the PUCCH is 1, 1a, or 1b. FIG. 9 illustrates a first control example in which the format of the PUCCH is 2, 2a, 2b, or 3. FIG. 10 illustrates a second control example in which the format of the PUCCH is 2, 2a, 2b, or 3.

The transmission and reception of the data and the transmission power control on the data and the RS1 by using the RS2 illustrated in FIG. 7 to FIG. 10 are the same as in the case of using the PUSCH described with reference to FIG. 3, and therefore, the explanation thereof will be omitted. However, in FIGS. 8 and 10, both of the slot 1 and the slot 2 include the RS2 with the known transmission power. This is because, in the PUCCH, the slot 1 and the slot 2 in one subframe may be allocated to resource blocks of different frequency bands due to frequency hopping as illustrated in FIG. 4. In this case, it is preferable to estimate average path loss between the slot 1 and the slot 2 by using the RS2s of both of the slot 1 and the slot 2.

Even in the PUSCH, the slot 1 and the slot 2 in one subframe may be allocated to resource blocks of different frequency bands due to frequency hopping. In this case, similarly to the PUCCH, it is preferable that both of the slot 1 and the slot 2 include the RS2s with the known transmission power even in the PUSCH.

Configuration of the Communication Terminal

Figure 11:
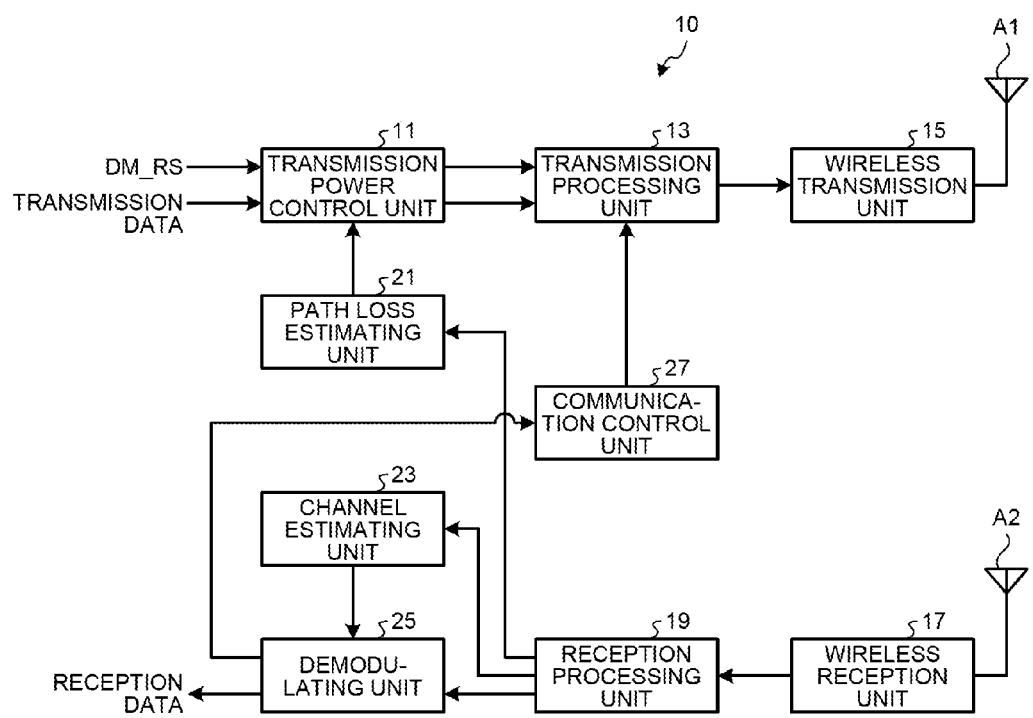
FIG. 11 is a functional block diagram illustrating an example of a communication terminal of the first embodiment.

FIG. 11 is a functional block diagram illustrating an example of the communication terminal of the first embodiment. A communication terminal 10 illustrated in FIG. 11 corresponds to the communication terminals UE1 and UE2 illustrated in FIG. 1. The communication terminal 10 includes a transmission power control unit 11, a transmission processing unit 13, a wireless transmission unit 15, and an antenna A1. The communication terminal 10 further includes an antenna A2, a wireless reception unit 17, a reception processing unit 19, a path loss estimating unit 21, a channel estimating unit 23, a demodulating unit 25, and a communication control unit 27.

In the transmission power control unit 11, the DM_RSs, that is, the RS1 and the RS2 as described above, and transmission data are input. Furthermore, in the transmission power control unit 11, a path loss value estimated by the path loss estimating unit 21 is input from the path loss estimating unit 21. The transmission power control unit 11 controls the transmission power of the transmission data, the RS1, and the RS2 as described above, and outputs the transmission data, the RS1, and the RS2 subjected to the transmission power control to the transmission processing unit 13. Specifically, while the communication terminal 10 is performing the D2D communication, the transmission power control unit 11 controls the transmission power of the data based on the path loss value, and controls the transmission power of the RS1 so as to reach the transmission power linked to the transmission power of the data. For example, the transmission power control unit 11 controls the transmission power of the RS1 such that it becomes the same transmission power as the transmission power of the data. Furthermore, the transmission power control unit 11 controls the transmission power of the RS2 so as to reach the known transmission power.

In the transmission processing unit 13, resource allocation information is input from the communication control unit 27. The transmission processing unit 13 maps the transmission data, the RS1, and the RS2 to respective slots of a subframe corresponding to a resource block allocated to the communication terminal 10 in accordance with the resource allocation information, performs a predetermined transmission process, and outputs them to the wireless transmission unit 15. The predetermined transmission process includes a modulation process. Furthermore, if the transmission signal is an SC-FDMA signal or an Orthogonal Frequency Division Multiplexing (OFDM) signal, the predetermined transmission process includes Inverse Fast Fourier Transform (IFFT).

The wireless transmission unit 15 performs a predetermined wireless transmission process, that is, digital-to-analog conversion, up-conversion, or the like on the transmission signal subjected to the predetermined transmission process, and transmits the transmission signal subjected to the predetermined wireless transmission process via the antenna A1.

The wireless reception unit 17 performs a predetermined wireless reception process, that is, down-conversion, analog-to-digital conversion, or the like on a reception signal received via the antenna A2, and outputs the reception signal subjected to the predetermined wireless reception process to the reception processing unit 19. The reception signal includes the resource allocation information or/and control information, such as information on a modulation and coding scheme, the data, the RS1, and the RS2. The RS1 is a DM_RS that is transmitted from a different communication terminal as a communication partner in the D2D communication by using the transmission power linked to the transmission power of the data, that is, by using the same transmission power as the transmission power of the data, for example. The RS2 is a DM_RS that is transmitted from the different communication terminal as the communication partner in the D2D communication by using the known transmission power.

The reception processing unit 19 performs a predetermined reception process on the reception signal, outputs the RS2 to the path loss estimating unit 21, outputs at least the RS1 to the channel estimating unit 23, and outputs the data and the control information to the demodulating unit 25. If the reception signal is an SC-FDMA signal or an OFDM signal, the predetermined reception process includes Fast Fourier Transform (FFT).

The path loss estimating unit 21 already knows a transmission power value of the RS2 input from the reception processing unit 19. Therefore, the path loss estimating unit 21 estimates a path loss value between the communication terminal 10 and the different communication terminal as the communication partner in the D2D communication, on the basis of the known transmission power value and a reception power value of the RS2, and outputs the estimated path loss value to the transmission power control unit 11.

The channel estimating unit 23 performs channel estimation between the communication terminal 10 and the communication terminal as the communication partner in the D2D communication by using at least the RS1 to calculate a channel estimated value, and outputs the calculated channel estimated value to the demodulating unit 25.

The demodulating unit 25 performs a demodulation process on the data and the control information by using the channel estimated value input from the channel estimating unit 23, and outputs reception data obtained by the demodulation process to a functional unit in a subsequent stage (not illustrated). Furthermore, the demodulating unit 25 outputs the control information obtained by the demodulation process to the communication control unit 27. In this example, it is assumed that the communication control unit 27 controls communication based on the control information transmitted from the different device; however, the control is not limited to this example. For example, the communication control unit 27 may determine a modulation and coding scheme (MCS) for data that it transmits, by using a path loss estimated value of a signal from the communication partner.

The communication control unit 27 performs various kinds of control related to the D2D communication. For example, the communication control unit 27 acquires the resource allocation information from the input control information, and outputs the resource allocation information to the transmission processing unit 13.

Process Performed by the Communication Terminal

Figure 12:
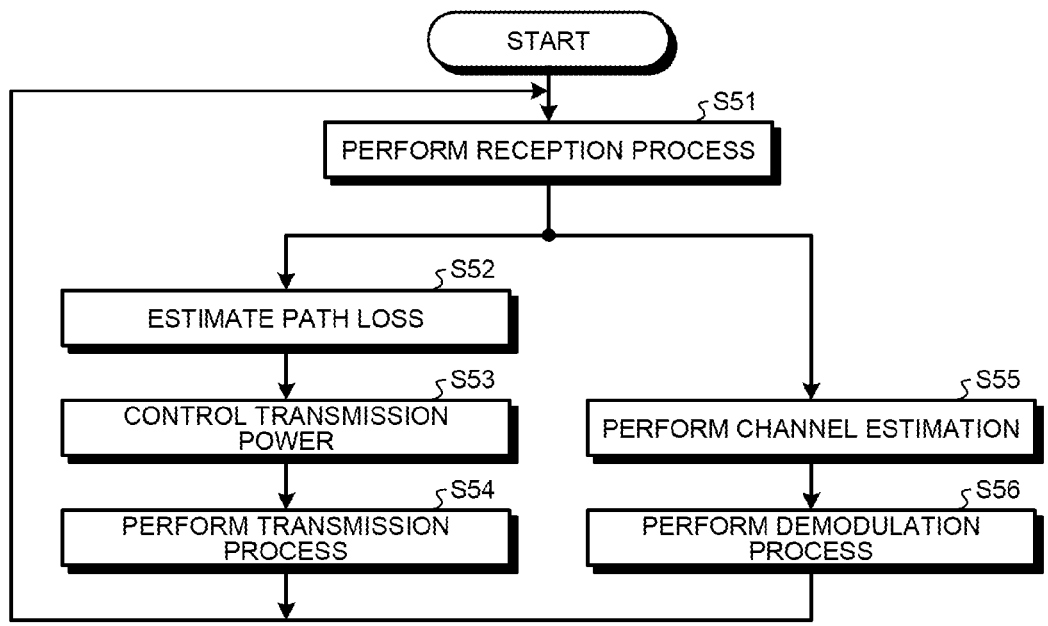
FIG. 12 is a flowchart for explaining a process performed by the communication terminal of the first embodiment.

FIG. 12 is a flowchart for explaining a process performed by the communication terminal of the first embodiment. The flowchart in FIG. 12 starts when the power of the communication terminal 10 is turned on, and ends when the power is turned off.

The reception processing unit 19 performs the predetermined reception process on the reception signal (Step S51), and then the path loss estimating unit 21 estimates path loss by using the RS2 transmitted with the known transmission power (Step S52). The channel estimating unit 23 performs channel estimation by using the RS1 transmitted with the transmission power linked to the transmission power of the data (Step S55).

After estimation of the path loss, the transmission power control unit 11 controls the transmission power of the transmission data and the RS1 on the basis of the path loss value (Step S53). Furthermore, the transmission power control unit 11 controls the transmission power of the RS2 so as to reach the known transmission power (Step S53). Then, the transmission processing unit 13 performs the predetermined wireless process on the data, the RS1, and the RS2 subjected to the transmission power control, and the data, the RS1, and the RS2 are transmitted from the wireless transmission unit 15 (Step S54).

After the channel estimation, the demodulating unit 25 performs the demodulation process by using the channel estimated value (Step S56).

After the processes at Steps S54 and S56, the process returns to Step S51.

The process at Step S51 and the processes from Steps S52 to S56 may be performed in reverse order.

Sequence of a Process Performed by the Communication System

Figure 13:
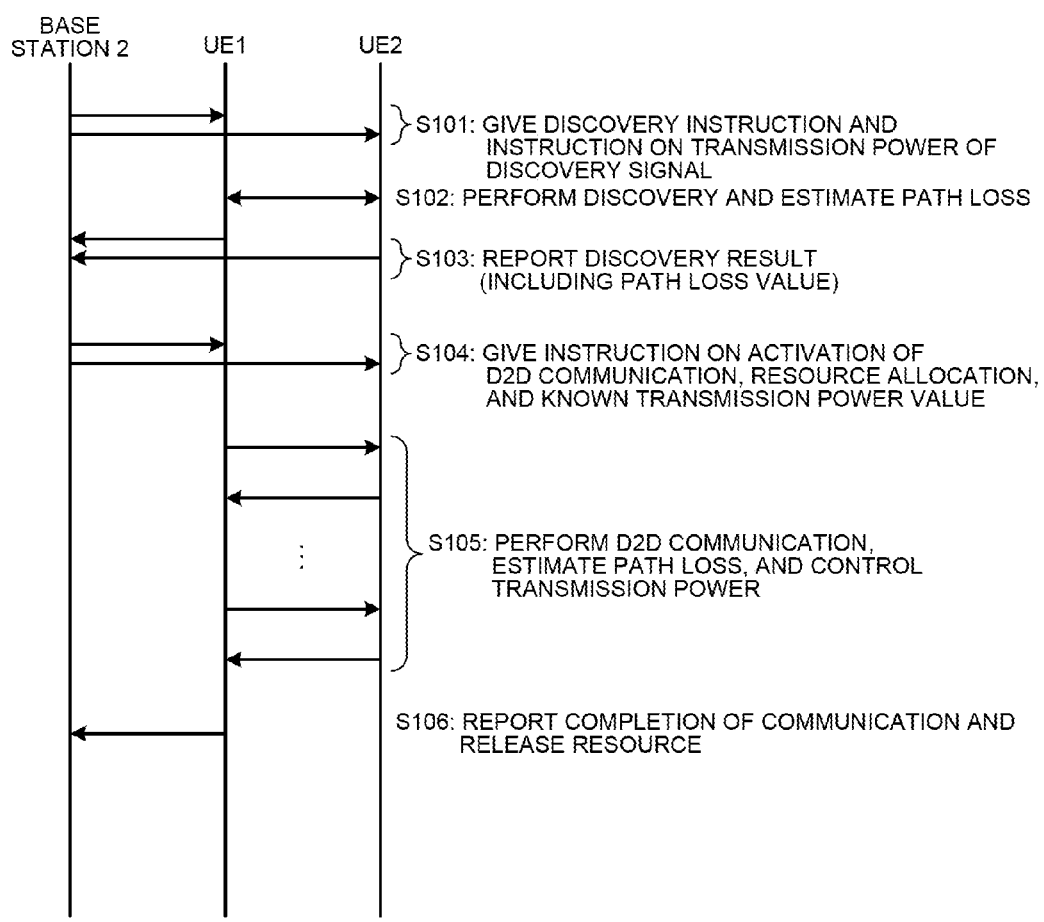
FIG. 13 is a diagram illustrating an example of a sequence of a process performed by the communication system of the first embodiment.
Figure 14:
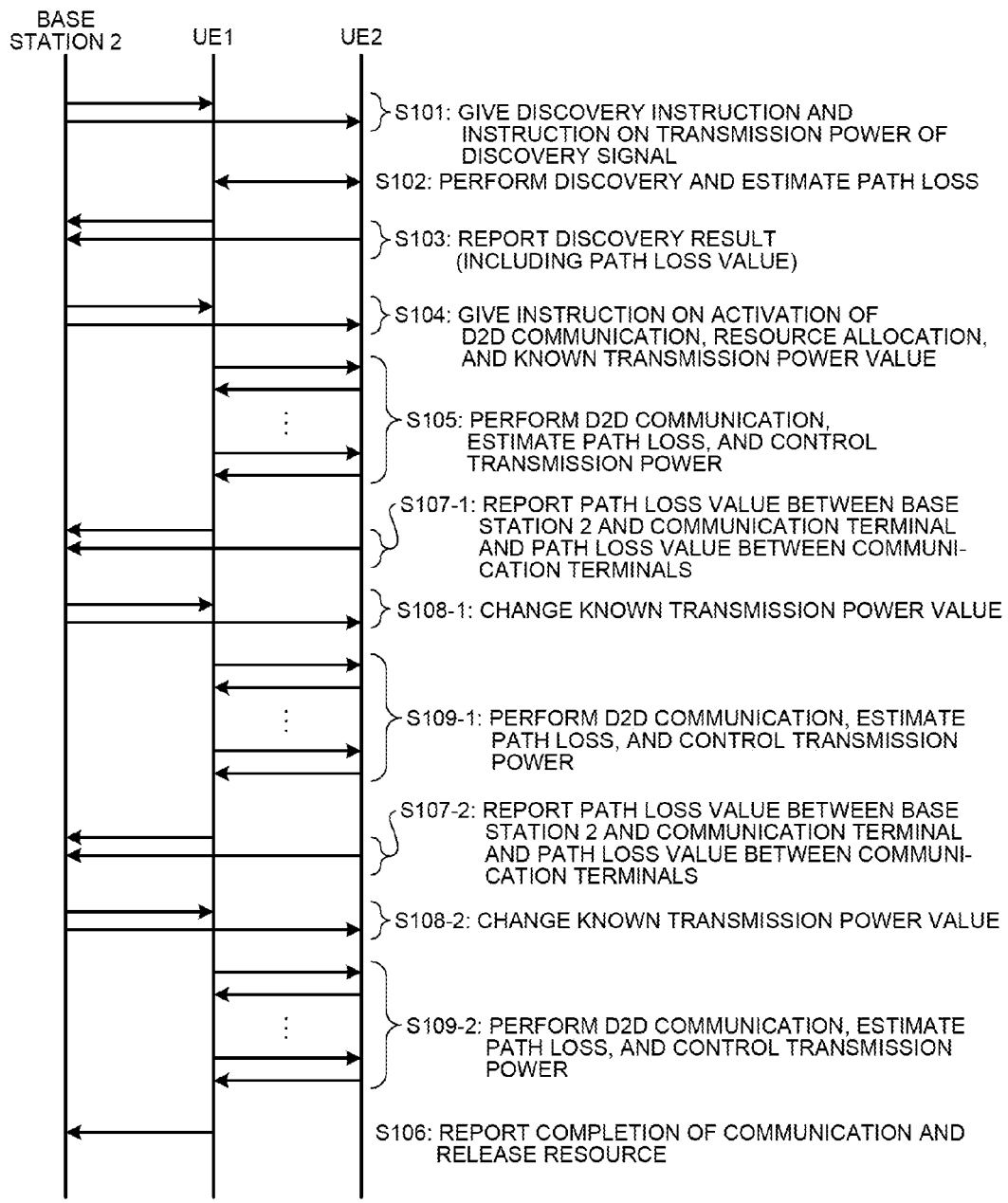
FIG. 14 is a diagram illustrating an example of a sequence of a process performed by the communication system of the first embodiment.

FIG. 13 and FIG. 14 are diagrams illustrating examples of a sequence of a process performed by the communication system of the first embodiment. In FIG. 13, a case will be described in which the known transmission power of the RS2 is not changed during the D2D communication. In FIG. 14, a case will be described in which the known transmission power of the RS2 is changed during the D2D communication.

Processing Sequence when the Known Transmission Power of the RS2 is not Changed During the D2D Communication (FIG. 13)

The base station 2 communicating with the communication terminals UE1 and UE2, upon detecting that the communication terminal UE1 and the communication terminal UE2 are located close to each other, gives a discovery instruction (a detection instruction or a finding instruction for the meaning in Japanese) to the communication terminals UE1 and UE2, and gives an instruction on transmission power of the discovery signal (Step S101).

In accordance with the instructions at Step S101, the communication terminals UE1 and UE2 performs discovery by transmitting discovery signals to each other, and determines whether both of the communication terminals are located close to each other such that the D2D communication is possible. Furthermore, the communication terminals UE1 and UE2 estimate path loss between the communication terminals (Step S102). The estimation of the path loss is performed by using the discovery signals transmitted from the communication terminals UE1 and UE2 with the transmission power instructed at Step S101.

The communication terminals UE1 and UE2 report a discovery result to the base station 2 (Step S103). The discovery result includes a path loss value estimated at Step S102.

The base station 2 gives an instruction on activation (enabling) of the D2D communication, resource allocation, and a known transmission power value of the RS2 to the communication terminals UE1 and UE2 (Step S104).

The communication terminals UE1 and UE2 start the D2D communication in accordance with the instruction at Step S104. The communication terminals UE1 and UE2 transmit the RS2 with the known transmission power instructed at Step S104 during the D2D communication. Furthermore, the communication terminals UE1 and UE2 estimate path loss between the communication terminals by using the RS2, and controls the transmission power of the data and the RS1 based on the estimated path loss (Step S105).

If all pieces of data are transmitted and received through the D2D communication and the D2D communication is completed, the communication terminal UE1 reports the completion of the communication to the base station 2, and the base station 2 releases the resource of the D2D communication in response to the report (Step S106). If the quality of the D2D communication is reduced to less than a threshold during the D2D communication, it may be possible to finish the D2D communication and shifts from the D2D communication to communication using the base station 2.

The processes at Steps S102, S103, and S106 are mainly performed by the communication control unit 27, the path loss estimating unit 21, and the transmission power control unit 11.

Furthermore, the base station 2 may perform the process at Step S101 when one of the communication terminals UE1 and UE2 calls a request (connection request) before the communication terminals start communication. In this case, the other one of the communication terminals receives a discovery instruction from the base station 2 while being in a standby state.

Processing Sequence when the Known Transmission Power of the RS2 is Changed During the D2D Communication (FIG. 14)

The processes from Steps S101 to S106 in FIG. 14 are the same as those in FIG. 13, and therefore, the explanation thereof will be omitted.

During the D2D communication, each of the communication terminals UE1 and UE2 estimates path loss between the base station 2 and the own terminal, and reports an estimated path loss value to the base station 2. Furthermore, each of the communication terminals UE1 and UE2 reports a path loss value between the communication terminals estimated during the D2D communication to the base station 2 (Step S107-1).

If the path loss has changed by a predetermined amount or more based on the report obtained at Step S107-1, the base station 2 changes the known transmission power of the RS2, and gives an instruction on a changed known transmission power value to the communication terminals UE1 and UE2 (Step S108-1).

The communication terminals UE1 and UE2 transmit the RS2 with the changed known transmission power instructed at Step S108-1. Furthermore, the communication terminals UE1 and UE2 estimate path loss between the communication terminals by using the RS2 with the changed known transmission power, and controls the transmission power of the data and the RS1 based on the estimated path loss (Step S109-1).

At Steps S107-2 to S109-2, the same processes as those at Steps S107-1 to S109-1 are performed.

The processes at Steps S107-1 and S107-2 are mainly performed by the path loss estimating unit 21.

Known Transmission Power of the RS2

Figure 15:
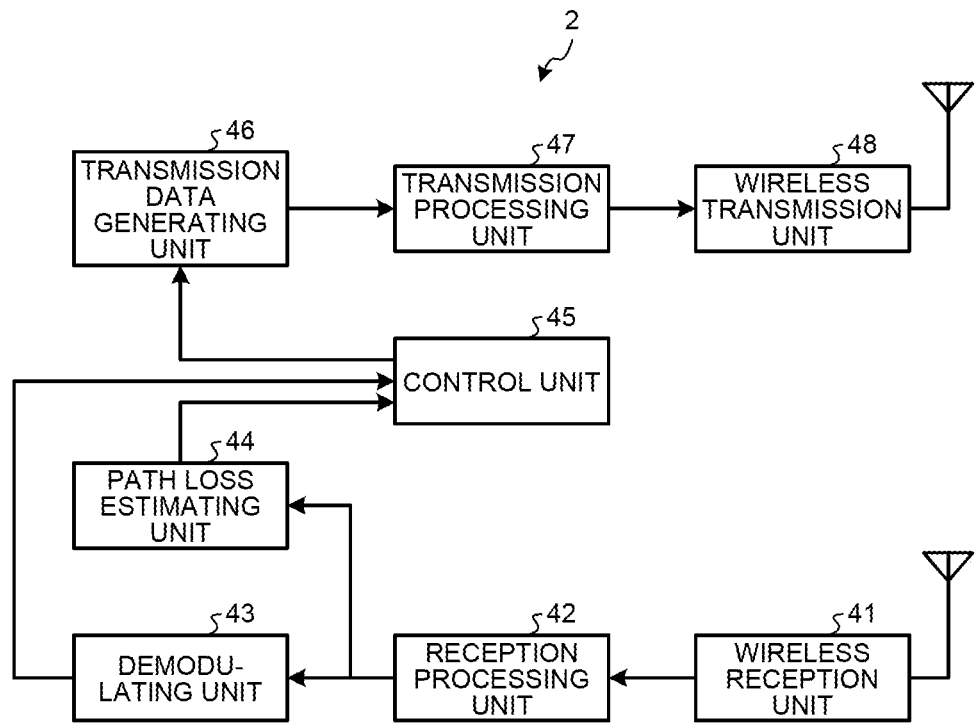
FIG. 15 is a block diagram illustrating an example of a base station of the first embodiment.
Figure 16:
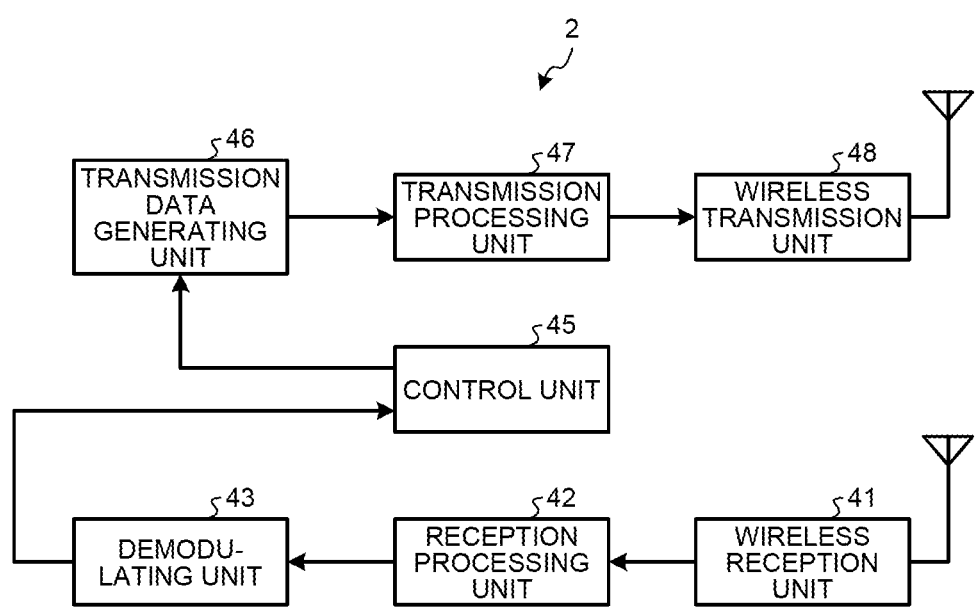
FIG. 16 is a block diagram illustrating an example of the base station of the first embodiment.

For example, the known transmission power of the RS2 is set as described below. In the following, first to sixth setting examples will be described. FIG. 15 and FIG. 16 are block diagrams illustrating examples of the base station of the first embodiment. FIG. 15 is a block diagram illustrating a configuration example for estimating path loss by using a signal transmitted by each of the communication terminals. FIG. 16 is a block diagram illustrating a configuration example in which each of the communication terminals estimates path loss with respect to the base station, and reports an estimated value to the base station. In FIG. 15, the base station 2 includes a wireless reception unit 41, a reception processing unit 42, a demodulating unit 43, a path loss estimating unit 44, a control unit 45, a transmission data generating unit 46, a transmission processing unit 47, and a wireless transmission unit 48. The wireless reception unit 41 performs a predetermined wireless reception process, that is, down-conversion, analog-to-digital conversion, or the like on a reception signal received via an antenna, and outputs the reception signal subjected to the predetermined wireless reception process to the reception processing unit 42. The reception processing unit 42 performs a predetermined reception process on the reception signal, outputs a discovery signal or a synchronization signal to the path loss estimating unit 44, and outputs data and control information to the demodulating unit 43. The demodulating unit 43 performs a demodulation process on the data and the control information, and outputs reception data obtained by the demodulation process to a functional unit in a subsequent stage (not illustrated). Furthermore, the demodulating unit 43 outputs control information obtained by the demodulation process to the control unit 45. The path loss estimating unit 44 estimates path loss based on reception power of the discovery signal or the synchronization signal. The control unit 45 determines known transmission power of the RS2 based on the path loss received from the path loss estimating unit 44. In the configuration in FIG. 16, the control unit 45 determines known transmission power of the RS2 based on a path loss report value that is transmitted from each of the communication terminals and that is included in a signal received from the demodulating unit 43. The transmission data generating unit 46 generates transmission data including a known transmission power value determined by the control unit 45, and outputs the transmission data to the transmission processing unit 47. The transmission processing unit 47 performs a predetermined transmission process on the transmission data generated by the transmission data generating unit 46, and outputs the transmission data to the wireless transmission unit 48. The wireless transmission unit 48 performs a predetermined wireless transmission process, that is, digital-to-analog conversion, up-conversion, or the like on a transmission signal subjected to the predetermined transmission process, and transmits the transmission signal subjected to the predetermined wireless transmission process via an antenna.

First Setting Example

A maximum value of the transmission power of the RS1 is set to the known transmission power of the RS2, or an initial value of the transmission power of the RS1 is set to the known transmission power of the RS2. In this case, the maximum value of the transmission power of the RS1 and the initial value of the transmission power of the RS1 may be the same value. Furthermore, the base station 2 notifies the communication terminals UE1 and UE2 of the set known transmission power or of the initial value and the maximum value of the transmission power of the RS1.

It is preferable to determine the maximum value of the transmission power of the RS1 based on path loss between the base station 2 and the communication terminals UE1 and UE2 in order to prevent interference of the D2D communication with the cellular communication. In this case, the base station 2 estimates the path loss by receiving a discovery signal or a synchronization signal transmitted by each of the communication terminals, and determines the maximum value of the transmission power of the RS1 based on the estimated path loss. Alternatively, the base station 2 estimates the path loss by receiving the RS2 with the known transmission power, and determines the maximum value of the transmission power of the RS1 based on the estimated path loss. FIG. 15 is a functional block diagram illustrating an example of the base station in this case. Alternatively, the communication terminals UE1 and UE2 estimate path loss between the own terminals and the base station 2 by receiving a Primary Synchronization Signal/Secondary Synchronization Signal (PSS/SSS), a Cell-specific Reference Signal (CRS), a Channel State Information-Reference Signal (CSI-RS), or the like transmitted from the base station 2 and reports the path loss to the base station 2, and the base station 2 determines the maximum value of the transmission power of the RS1 based on the reported path loss. FIG. 16 is a functional block diagram illustrating an example of the base station in this case. Alternatively, the communication terminals UE1 and UE2 determine the maximum value of the transmission power of the RS1 in accordance with a predetermined rule or a predetermined computation formula based on the path loss between the own terminals and the base station 2.

Second Setting Example

The known transmission power of the RS2 is set to a transmission power value corresponding to path loss between the communication terminals. In this case, the communication terminals UE1 and UE2 periodically reports path loss between the communication terminals to the base station 2, and the base station 2 periodically updates the known transmission power of the RS2 based on the report. The base station 2 sets the known transmission power of the RS2 to a greater value with an increase in the path loss. However, the base station 2 sets the known transmission power of the RS2 to a greater value than the transmission power of the data. The base station 2 notifies the communication terminals UE1 and UE2 of the set known transmission power. The base station 2 may issue an alarm when the transmission power of the data reaches the transmission power of the RS2. It is preferable that an update cycle of the known transmission power of the RS2 is longer than a time order of the transmission power control based on the path loss (for example, a Round Trip Time (RTT) between the communication terminals).

Third Setting Example

The known transmission power of the RS2 is set to a transmission power value corresponding to path loss between the base station 2 and the communication terminals UE1 and UE2. In this case, each of the communication terminals periodically estimates path loss between the own terminal and the base station 2 and gives a report to the base station 2 of the estimated path loss. Alternatively, the base station 2 estimates the path loss between the base station 2 and each of the communication terminals. The base station 2 periodically updates the known transmission power of the RS2 based on the path loss between the base station 2 and the communication terminals UE1 and UE2, which is reported from each of the communication terminals or which is estimated by the base station 2. The base station 2 sets the known transmission power of the RS2 to a greater value with an increase in the path loss. The base station 2 notifies the communication terminals UE1 and UE2 of the set known transmission power.

Fourth Setting Example

Figure 27:
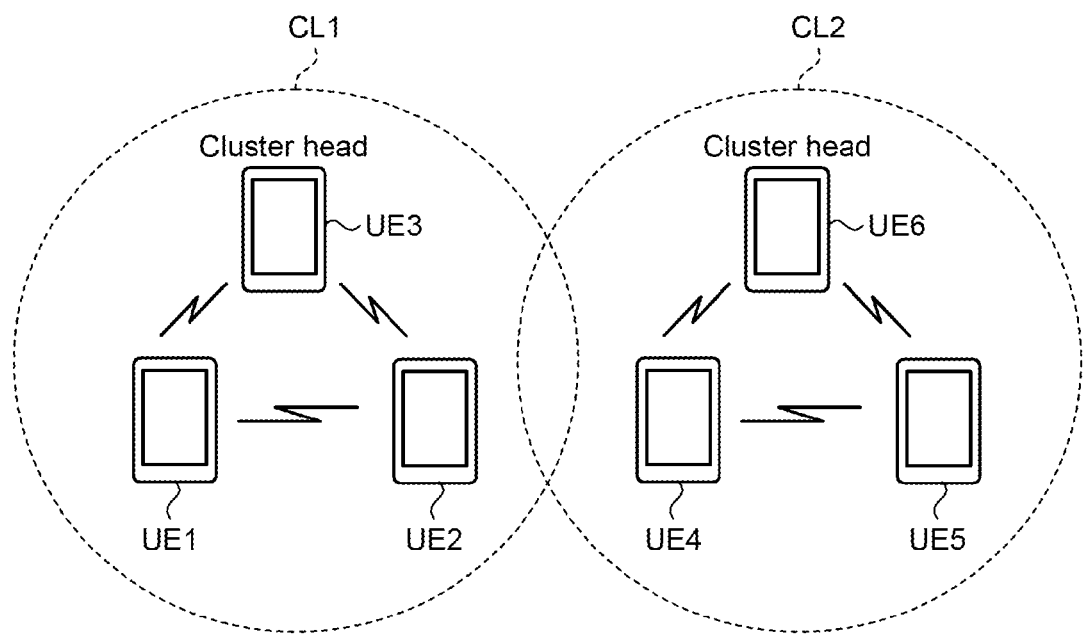
FIG. 27 is a diagram illustrating an example of a configuration of a communication system of a still another embodiment.

As illustrated in FIG. 27 to be described later, if a plurality of clusters, each including a number of communication terminals located close to each other, is constructed, a communication terminal serving as a cluster head sets the known transmission power of the RS2 to a transmission power value with a magnitude that does not cause interference between the clusters. That is, the known transmission power of the RS2 is set to transmission power corresponding to an expected cluster radius. The cluster head notifies each of the communication terminals of the set known transmission power.

Fifth Setting Example

The known transmission power of the RS2 is set to a transmission power value corresponding to a maximum terminal-to-terminal distance that allows the D2D communication. Specifically, the known transmission power of the RS2 is set to a greater value with an increase in the maximum terminal-to-terminal distance that allows the D2D communication.

Sixth Setting Example

The known transmission power of the RS2 is set to a power value in a range of the "UE maximum output power" defined in the LTE standard specification. Alternatively, the known transmission power of the RS2 is set to a maximum output power of a terminal allowed for data.

As described above, in the embodiment, the communication system 1 includes the communication terminal UE1 and the communication terminal UE2 that performs the D2D communication with the communication terminal UE1. The communication terminal UE1 controls the transmission power of the RS1 so as to reach the transmission power linked to the transmission power of the transmission data and controls the transmission power of the RS2 so as to reach the known transmission power, among a plurality of DM_RSs transmitted with the transmission data from the own terminal. Then, the communication terminal UE1 transmits the RS1 and the RS2 subjected to the transmission power control to the communication terminal UE2. Meanwhile, the communication terminal UE2 receives the RS1 and the RS2 transmitted from the communication terminal UE1, and estimates path loss between the communication terminal UE1 and the own terminal by using the RS2 with the known transmission power. Then, the communication terminal UE2 controls transmission power of transmission data from the own terminal based on the estimated path loss, and transmits the transmission data subjected to the transmission power control to the communication terminal UE1.

Furthermore, a communication terminal 10 serving as the communication terminal UE1 includes the transmission power control unit 11 and the wireless transmission unit 15. The transmission power control unit 11 controls the transmission power of the RS1 so as to reach the transmission power linked to the transmission power of the transmission data and controls the transmission power of the RS2 so as to reach the known transmission power, among a plurality of DM_RSs transmitted with the transmission data from the own terminal. The wireless transmission unit 15 transmits the RS1 and the RS2 subjected to the transmission power control to a different communication terminal that performs the D2D communication with the own terminal.

Moreover, the communication terminal 10 serving as the communication terminal UE2 includes the wireless reception unit 17, the path loss estimating unit 21, the transmission power control unit 11, and the wireless transmission unit 15. The wireless reception unit 17 receives the RS1 and the RS2 transmitted from a different communication terminal that performs the D2D communication with the own terminal. The path loss estimating unit 21 estimates path loss between the different communication terminal and the own terminal by using the RS2 with the known transmission power. The transmission power control unit 11 controls the transmission power of the transmission data from the own terminal based on the estimated path loss. The wireless transmission unit 15 transmits the transmission data subjected to the transmission power control to the different communication terminal.

With this configuration, it is possible to estimate path loss as needed during the D2D communication by using the RS2 with the known transmission power transmitted with the data in the D2D communication. Furthermore, in the embodiment, the transmission power of the RS2, which is a part of DM_RSs that are conventionally transmitted with the transmission data in the LTE, is controlled so as to reach the known transmission power without being linked to the transmission power of the data. Namely, in the embodiment, a part of the existing DM_RSs is used as an RS for estimating path loss by setting the part of the existing DM_RSs to the known transmission power, without newly adding the RS for estimating path loss to the existing RSs. Therefore, according to the embodiment, it becomes possible to control the transmission power in accordance with a change in the path loss in the D2D communication without increasing overhead.

Furthermore, in the embodiment, the RS1 that is controlled so as to reach the transmission power linked to the transmission power of the transmission data is included in one of two slots in a subframe, and the RS2 with the known transmission power is included in the other one of the slots in the subframe.

With this configuration, it is possible to use a part of DM_RSs that are conventionally transmitted with the transmission data in the LTE as the RS2 with the known transmission power.

Moreover, in the embodiment, the communication terminals UE1 and UE2 receive an instruction on the known transmission power of the RS2 from the base station 2 before starting the D2D communication.

With this configuration, it is possible to transmit the RS2 with the optimal known transmission power determined by the base station 2, at the start of the D2D communication.

[b] Second Embodiment

Configuration of a Communication Terminal

Figure 17:
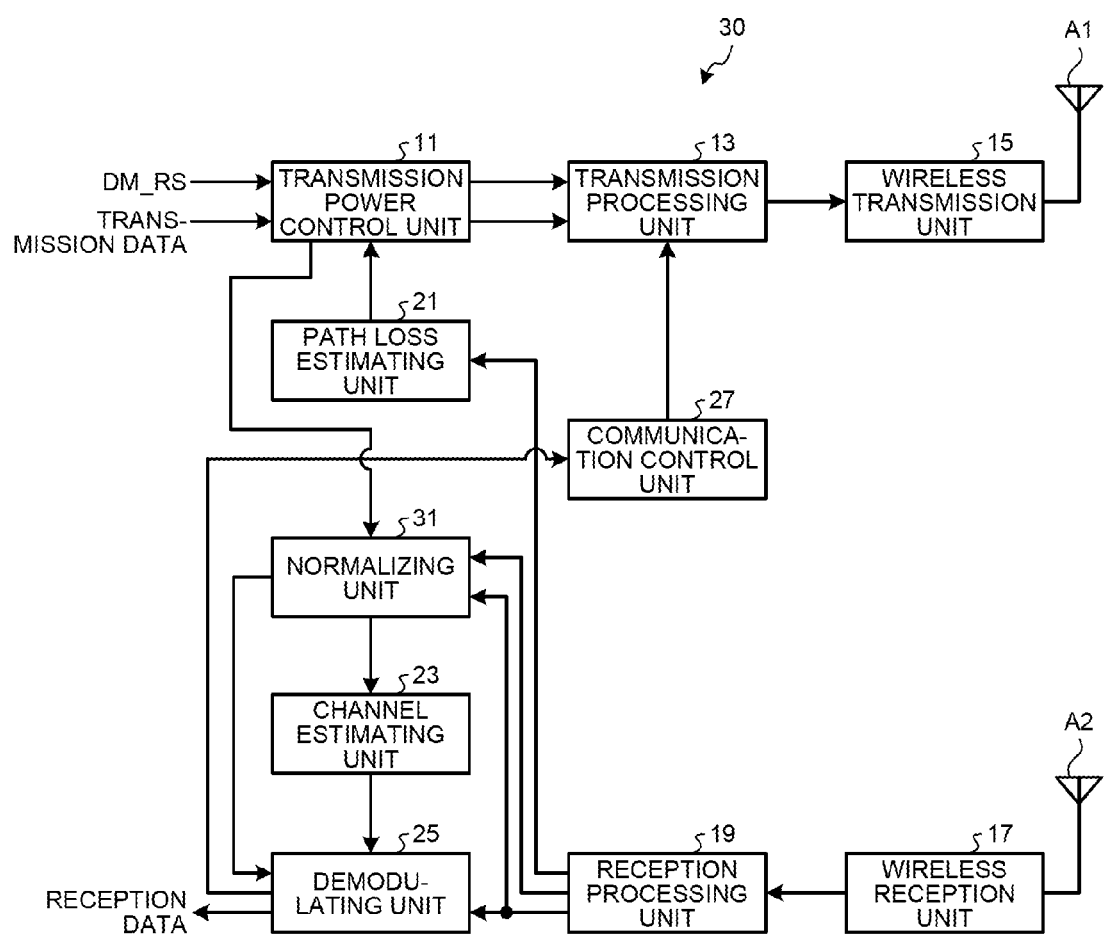
FIG. 17 is a functional block diagram illustrating an example of a communication terminal of a second embodiment.

FIG. 17 is a functional block diagram illustrating an example of a communication terminal of a second embodiment. A communication terminal 30 illustrated in FIG. 17 corresponds to the communication terminals UE1 and UE2 illustrated in FIG. 1. The communication terminal 30 includes a normalizing unit 31.

The normalizing unit 31 receives data, an RS1, and an RS2 from the reception processing unit 19, and normalizes the data, the RS1, and the RS2 as described below. In the following, first to fifth normalization examples of a normalization process performed by the normalizing unit 31 will be described. FIG. 17 to FIG. 20 are diagrams for explaining the normalization process of the second embodiment. The first to the fourth normalization examples are preferable when moving speeds of the communication terminal UE1 and the communication terminal UE2 are set such that the reception power or the path loss between the slot 1 and the slot 2 does not change. The fifth normalization example is preferable when a state of a propagation channel between the slot 1 and the slot 2 (the reception power, the path loss, or the phase of a reception signal) greatly changes.

First Normalization Example

FIG. 18

The normalizing unit 31 obtains average reception power of the RS1 included in the slot 1, and average reception power of the RS2 included in the slot 2. Then, the normalizing unit 31 obtains the normalized data, the normalized RS1, and the normalized RS2 in accordance with Expression (1) to Expression (3).

$$\text{NORMALIZED DATA} = \frac{\text{RECEIVED DATA}}{\sqrt{\text{AVERAGE RECEPTION POWER OF } RS1}} \quad (1)$$

$$\text{NORMALIZED } RS1 = \frac{\text{RECEIVED } RS1}{\sqrt{\text{AVERAGE RECEPTION POWER OF } RS1}} \quad (2)$$

$$\text{NORMALIZED } RS2 = \frac{\text{RECEIVED } RS2}{\sqrt{\text{AVERAGE RECEPTION POWER OF } RS2}} \quad (3)$$

Figure 18:
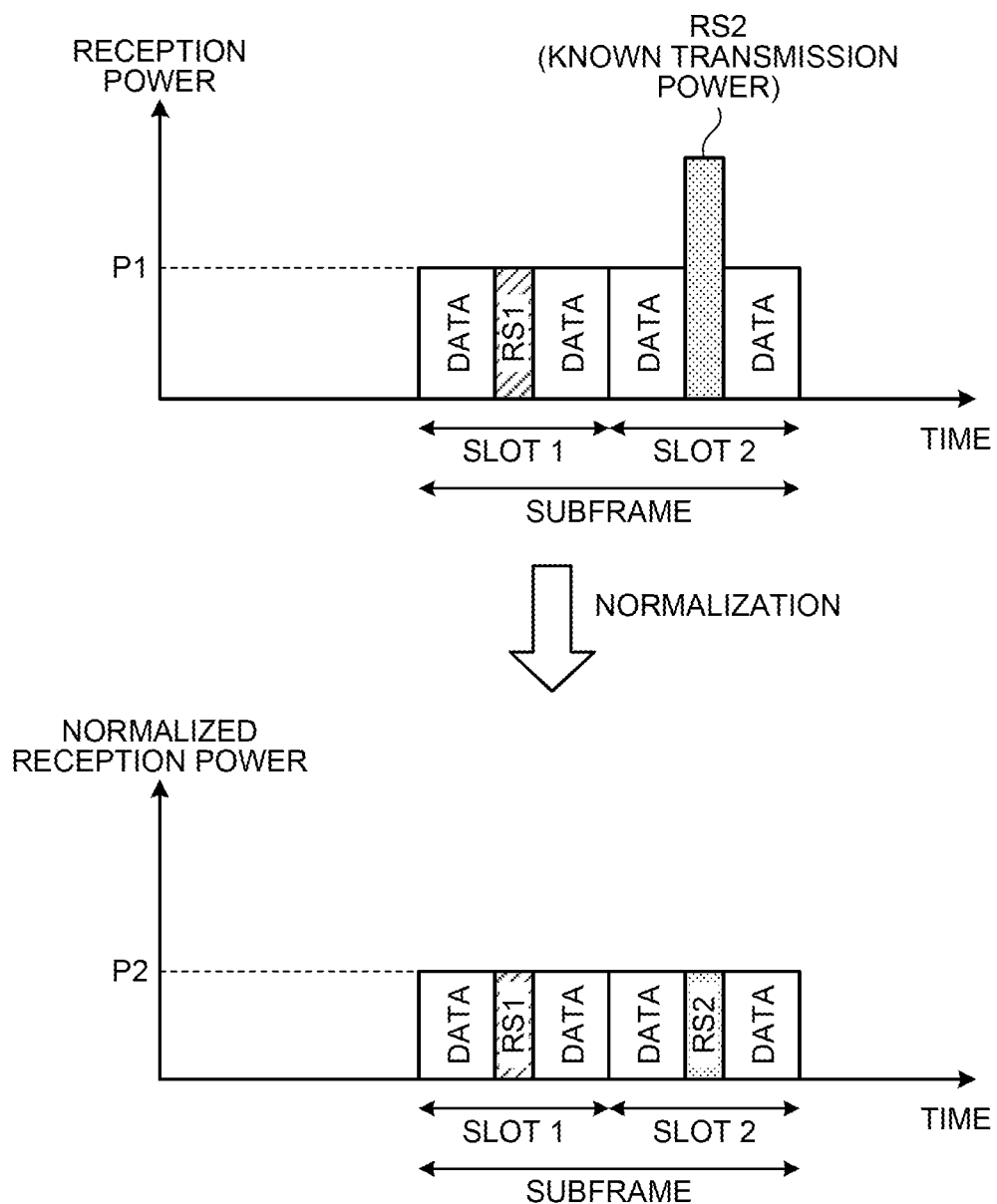
FIG. 18 is a diagram for explaining a normalization process of the second embodiment.

Consequently, if the reception power of the data and the reception power of the RS1 are the same, the data, the RS1, and the RS2 are normalized to single reception power P2 as illustrated in FIG. 18.

The normalizing unit 31 outputs the normalized RS1 and the normalized RS2 to the channel estimating unit 23, and outputs the normalized data to the demodulating unit 25.

The channel estimating unit 23 performs channel estimation in the slot 1 by using the normalized RS1, performs channel estimation in the slot 2 by using the normalized RS2, and outputs a channel estimated value of the slot 1 and a channel estimated value of the slot 2 to the demodulating unit 25.

The demodulating unit 25 performs a demodulation process on the normalized data in the slot 1 by using the channel estimated value of the slot 1. Furthermore, the demodulating unit 25 performs a demodulation process on the normalized data in the slot 2 by using the channel estimated value of the slot 2.

Alternatively, it may be possible to perform linear interpolation on the channel estimated value of the slot 1 and the channel estimated value of the slot 2 to obtain a channel estimated value at a time of each symbol, and perform a demodulation process on data of each symbol.

Second Normalization Example

FIG. 19

Figure 19:
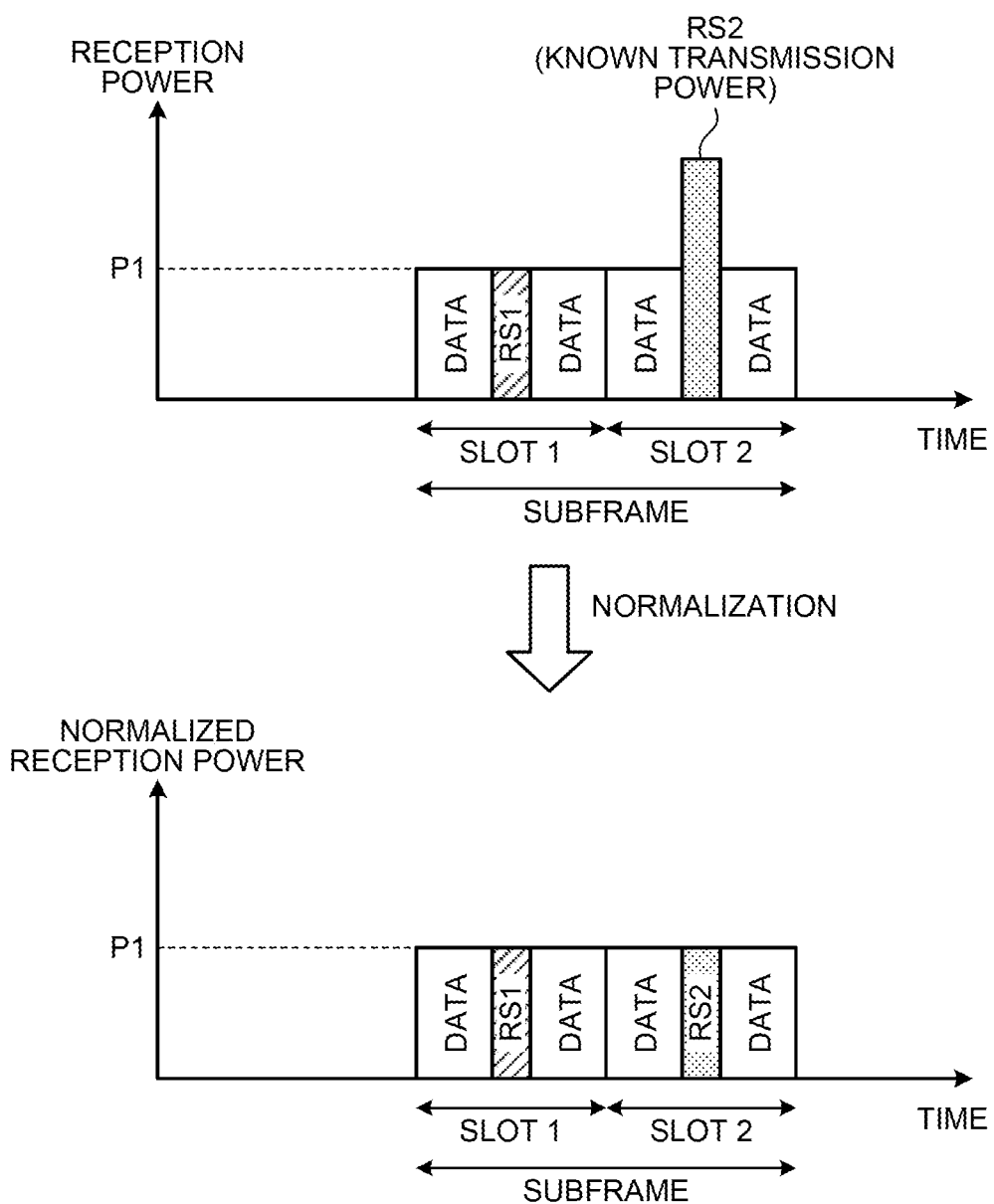
FIG. 19 is a diagram for explaining the normalization process of the second embodiment.

The normalizing unit 31 obtains average reception power of the RS1 included in the slot 1, and average reception power of the RS2 included in the slot 2. Then, the normalizing unit 31 obtains a normalized RS2 in accordance with Expression (4). Consequently, reception power of the normalized RS2 becomes the same as reception power P1 of the RS1 as illustrated in FIG. 19.

$$\text{NORMALIZED } RS2 = \frac{\text{RECEIVED } RS2}{\sqrt{\text{AVERAGE RECEPTION POWER OF } RS2}} \times \sqrt{\text{AVERAGE RECEPTION POWER OF } RS1} \quad (4)$$

The normalizing unit 31 outputs the RS1 input from the reception processing unit 19 and the normalized RS2 to the channel estimating unit 23.

The channel estimating unit 23 performs channel estimation in the slot 1 by using the RS1, performs channel estimation in the slot 2 by using the normalized RS2, and outputs a channel estimated value of the slot 1 and a channel estimated value of the slot 2 to the demodulating unit 25. The explanation of the subsequent operation is the same as that of the first normalization example.

Third Normalization Example

The third normalization example is based on the assumption that path loss estimated by the communication terminal UE1 and path loss estimated by the communication terminal UE2 are the same, and therefore, the transmission power in the communication terminal UE1 and the transmission power in the communication terminal UE2 become the same.

If this assumption is used as a basis, the transmission power of the RS1 and the transmission power of the RS2 is input to the normalizing unit 31 from the transmission power control unit 11. Then, the normalizing unit 31 obtains normalized data, a normalized RS1, and a normalized RS2 in accordance with Expression (5) to Expression (7). The explanation of the subsequent operation is the same as that of the first normalization example.

$$\text{NORMALIZED DATA} = \frac{\text{RECEIVED DATA}}{\sqrt{\text{TRANSMISSION POWER OF } RS1}} \quad (5)$$

$$\text{NORMALIZED } RS1 = \frac{\text{RECEIVED } RS1}{\sqrt{\text{TRANSMISSION POWER OF } RS1}} \quad (6)$$

$$\text{NORMALIZED } RS2 = \frac{\text{RECEIVED } RS2}{\sqrt{\text{TRANSMISSION POWER OF } RS2}} \quad (7)$$

Fourth Normalization Example

The fourth normalization example is based on the assumption used in the third normalization example, and transmission power is used instead of the average reception power in Expression (4) used in the second normalization example. That is, the normalizing unit 31 obtains a normalized RS2 in accordance with Expression (8). The explanation of the subsequent operation is the same as that of the second normalization example.

$$\text{NORMALIZED } RS2 = \frac{\text{RECEIVED } RS2}{\sqrt{\text{TRANSMISSION POWER OF } RS2}} \times \sqrt{\text{TRANSMISSION POWER OF } RS1} \quad (8)$$

Fifth Normalization Example

FIG. 20

The normalizing unit 31 obtains average reception power of the RS2 included in the slot 2, and average reception power of the data included in the slot 2. Then, the normalizing unit 31 obtains a normalized RS2 in accordance with Expression (9).

$$\text{NORMALIZED } RS2 = \frac{\text{RECEIVED } RS2}{\sqrt{\text{AVERAGE RECEPTION POWER OF } RS2} \times \sqrt{\text{AVERAGE RECEPTION POWER OF DATA IN SLOT 2}}} \quad (9)$$

Figure 20:
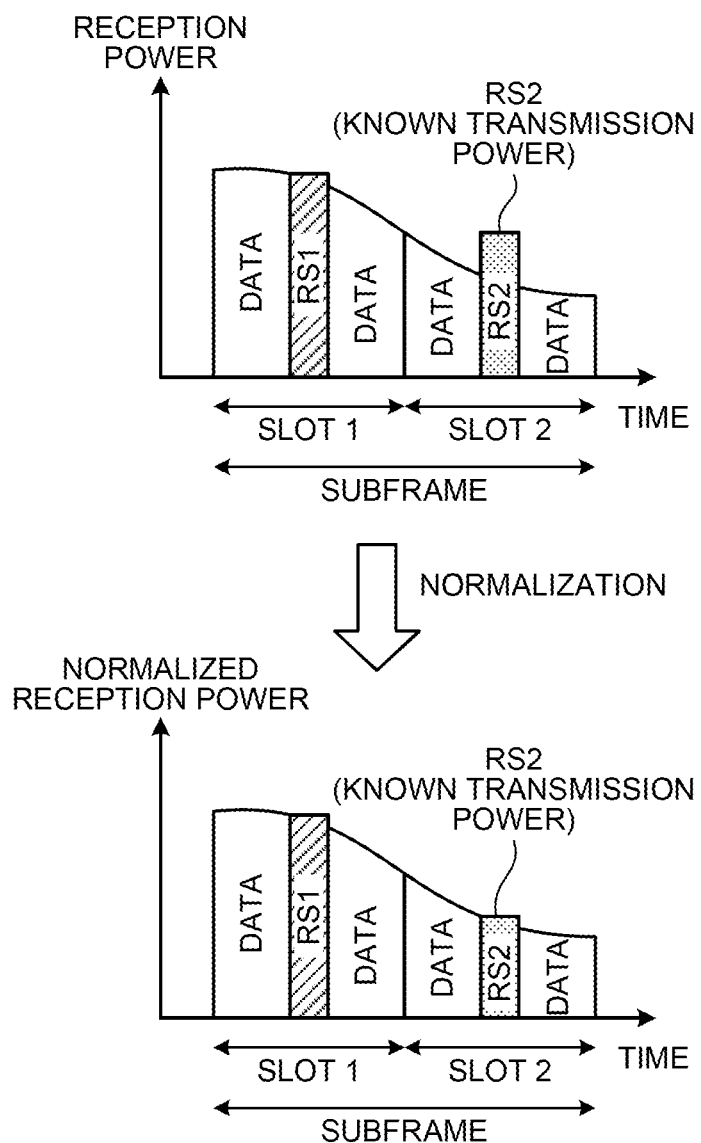
FIG. 20 is a diagram for explaining the normalization process of the second embodiment.

Consequently, reception power of the normalized RS2 becomes the same as the average reception power of the data included in the slot 2 as illustrated in FIG. 20. The explanation of the subsequent operation is the same as that of the second normalization example.

In the fifth normalization example, even when moving speeds of one or both of the communication terminal UE1 and the communication terminal UE2 are high and the state of the propagation channel greatly changes between the slot 1 and the slot 2, it is possible to perform channel estimation with higher accuracy.

If the transmission power of the RS1 is not the same as the transmission power of the data, it is preferable to further multiply the right side of Expression (9) by an "amplitude ratio of the RS1 to the data".

Process Performed by the Communication Terminal

Figure 21:
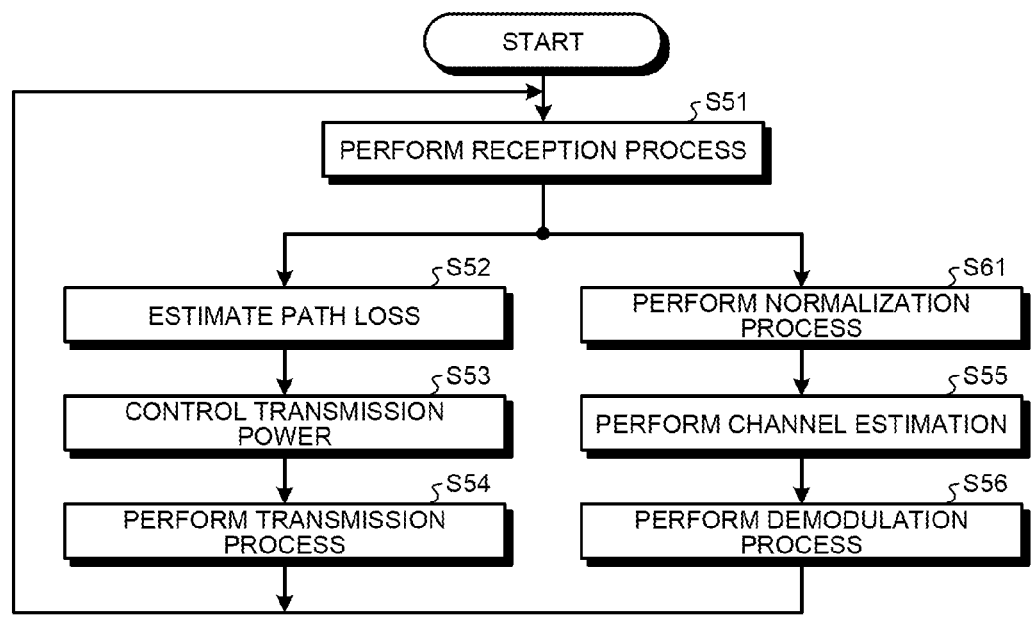
FIG. 21 is a flowchart for explaining a process performed by the communication terminal of the second embodiment.

FIG. 21 is a flowchart for explaining a process performed by the communication terminal of the second embodiment. The flowchart illustrated in FIG. 21 starts when the power of the communication terminal 30 is turned on, and ends when the power is turned off.

The flowchart illustrated in FIG. 21 is different from the flowchart in FIG. 12 (the first embodiment) in that the normalizing unit 31 performs the normalization process of any of the first to the fifth normalization examples as described above (Step S61) before channel estimation (Step S55).

As described above, in the embodiment, the communication terminals UE1 and UE2 normalize the RS2 by using the average reception power or the transmission power of the RS2 with the known transmission power, and performs channel estimation by using the normalized RS2.

With this configuration, the reception power of the RS2 is normalized to the reception power of the data, so that channel estimation using the RS2 is enabled. Therefore, it is possible to improve the accuracy of the channel estimation as compared to the first embodiment.

Incidentally, it is possible to more accurately perform normalization by explicitly notifying the communication terminals UE1 and UE2 of a ratio between the known transmission power value of the RS2 and the transmission power value of the RS1 by L1 signaling or the like. In this case, the L1 signaling is transmitted with data by time division multiplexing or frequency division multiplexing.

[c] Third Embodiment

In a third embodiment, an example of arrangement of DM_RSs will be described. FIG. 22 to FIG. 25 are diagrams illustrating examples of arrangement of DM_RSs of the third embodiment. In the following, first to fourth arrangement examples will be described.

First Arrangement Example

FIG. 22

Figure 22:
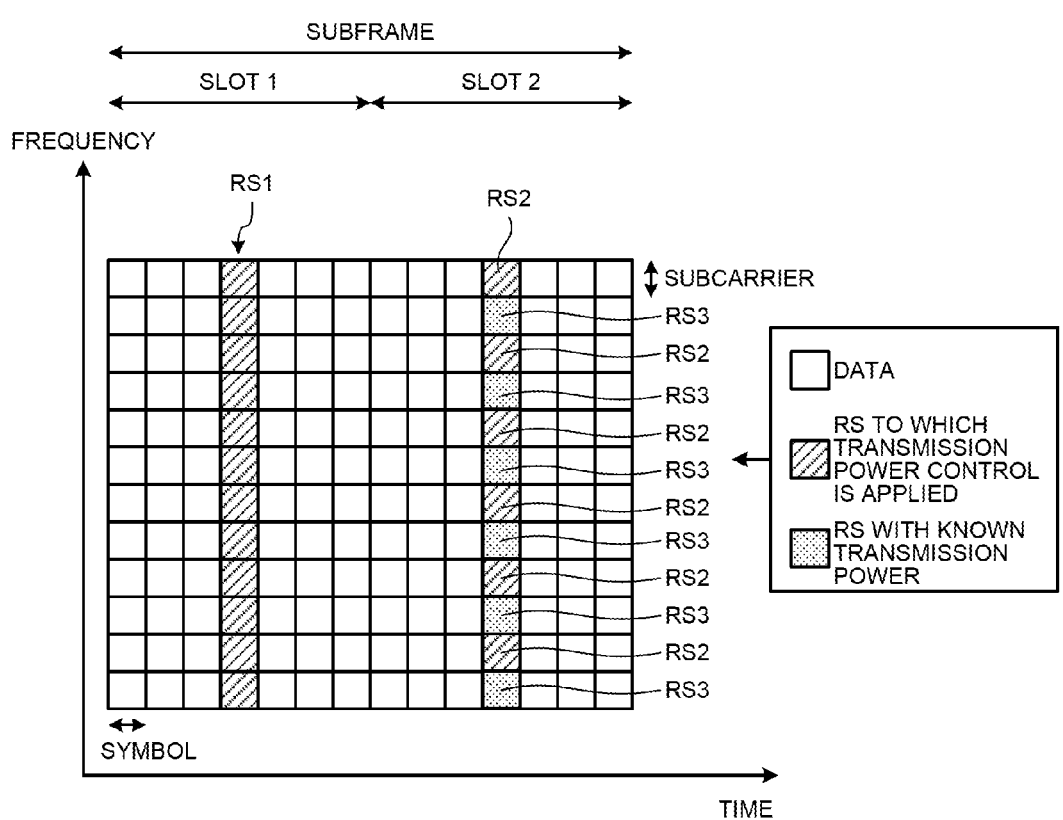
FIG. 22 is a diagram illustrating an arrangement example of DM_RSs of a third embodiment.

In the first arrangement example, the transmission processing unit 13 arranges RS1s to RS3s, which are DM_RSs, as illustrated in FIG. 22. In FIG. 22, the RS1s and the RS2s are RSs to which the transmission power control is applied, that is, RSs that are controlled so as to reach the transmission power linked to the transmission power of the data, and the RS3s are RSs that are controlled so as to reach the known transmission power. Furthermore, one symbol includes subcarriers corresponding to the number of allocated resource blocks (RBs)×12 subcarriers (for example, if one RB is allocated, 12 subcarriers are included). Specifically, the transmission processing unit 13 arranges the RS1s in all of subcarrier components included in the DM_RSs of the slot 1. Moreover, among 12 subcarrier components included in the DM_RSs of the slot 2, the transmission processing unit 13 arranges the RS2s in the odd-numbered subcarrier components and arranges the RS3s in the even-numbered subcarrier components. That is, in the first arrangement example, among the subcarrier components of the DM_RSs of the slot 2, first subcarrier components (the even-numbered subcarrier components) arranged at regular intervals are set to the known transmission power, and second subcarrier components (the odd-numbered subcarrier components) other than the first subcarrier components are set to the transmission power linked to the data. In other words, in the first arrangement example, the subcarrier components of the DM_RSs of the slot 2 are divided into teeth of a comb such that first teeth of the comb arranged at regular intervals are transmitted with the known transmission power and second teeth of the comb other than the first teeth are transmitted with the transmission power linked to the data.

Furthermore, if the DM_RSs are arranged as illustrated in FIG. 22, it is preferable that the normalizing unit 31 obtains a normalized RS3 in accordance with Expression (10). Consequently, average power of the RS3 becomes the same as average power of RS2, so that even when reception power changes due to a change in path loss or the like between the slot 1 and the slot 2, it is possible to perform normalization with accuracy.

$$\text{NORMALIZED } RS3 = \frac{\text{RECEIVED } RS3}{\sqrt{\text{AVERAGE RECEPTION POWER OF } RS3} \times \sqrt{\text{AVERAGE RECEPTION POWER OF } RS2}} \quad (10)$$

Second Arrangement Example

FIG. 23

Figure 23:
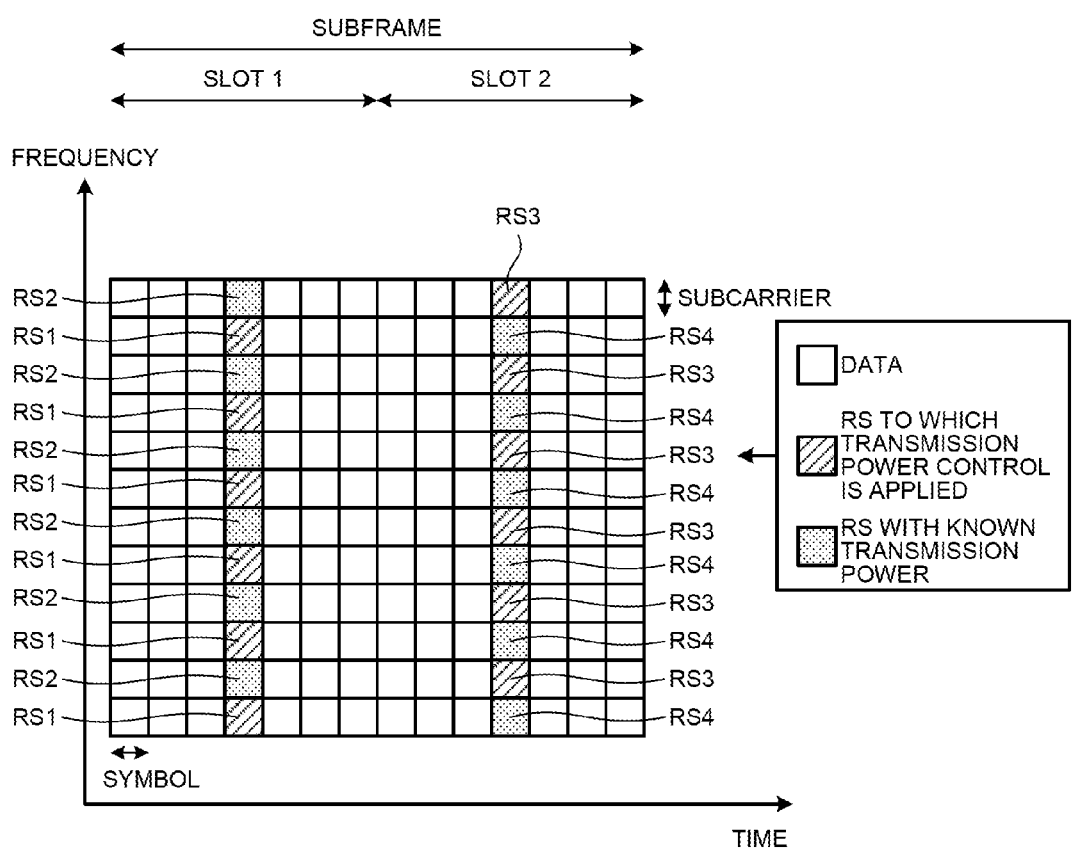
FIG. 23 is a diagram illustrating an arrangement example of the DM_RSs of the third embodiment.

In the second arrangement example, the transmission processing unit 13 arranges RS1s to RS4s, which are DM_RSs, as illustrated in FIG. 23. In FIG. 23, the RS1s and the RS3s are RSs to which the transmission power control is applied, that is, RSs that are controlled so as to reach the transmission power linked to the transmission power of the data, and the RS2s and the RS4s are RSs that are controlled so as to reach the known transmission power. Furthermore, one symbol includes subcarriers corresponding to the number of allocated resource blocks (RBs)×12 subcarriers (for example, if one RB is allocated, 12 subcarriers are included). Specifically, among the 12 subcarrier components included in the DM_RSs of the slot 1, the transmission processing unit 13 arranges the RS2s in odd-numbered subcarrier components and arranges the RS1s in the even-numbered subcarrier components. Furthermore, among the 12 subcarrier components included in the DM_RSs of the slot 2, the transmission processing unit 13 arranges the RS3s in odd-numbered subcarrier components and arranges the RS4s in the even-numbered subcarrier components. That is, in the second arrangement example, among the subcarrier components of the DM_RSs of the slot 1, first subcarrier components (the odd-numbered subcarrier components) arranged at regular intervals are set to the known transmission power, and second subcarrier components (the even-numbered subcarrier components) other than the first subcarrier components are set to the transmission power linked to the data. Furthermore, among the subcarrier components of the DM_RSs of the slot 2, third subcarrier components (the odd-numbered subcarrier components) arranged at regular intervals are set to the transmission power linked to the data, and fourth subcarrier components (the odd-numbered subcarrier components) other than the third subcarrier components are set to the known transmission power. In other words, in the second arrangement example, the subcarrier components of the DM_RSs of each of the slot 1 and the slot 2 are divided into teeth of a comb such that first teeth of the comb arranged at regular intervals are transmitted with the known transmission power, and second teeth of the comb other than the first teeth are transmitted with the transmission power linked to the data.

Furthermore, if the DM_RSs are arranged as illustrated in FIG. 23, it is preferable that the normalizing unit 31 obtains a normalized RS2 in accordance with Expression (4) and obtains a normalized RS4 in accordance with Expression (11). Consequently, average power of the RS2 becomes the same as average power of the RS1, and average power of the RS4 becomes the same as average power of the RS3, so that even when reception power changes due to a change in path loss or the like between the slot 1 and the slot 2, it is possible to perform normalization with accuracy.

$$\text{NORMALIZED } RS4 = \frac{\text{RECEIVED } RS4}{\sqrt{\text{AVERAGE RECEPTION POWER OF } RS4}} \times \sqrt{\text{AVERAGE RECEPTION POWER OF } RS3} \quad (11)$$

As described above, in the first arrangement example and the second arrangement example, the DM_RSs with the known transmission power are arranged in the first subcarrier components that are arranged at regular intervals among the subcarrier components of one symbol, and the DM_RSs with the transmission power linked to the transmission power of the data are arranged in the second subcarrier components other than the first subcarrier components.

With this configuration, even when the state of the propagation channel changes between the slots, it is possible to perform channel estimation in accordance with the change in the state of the propagation channel.

Third Arrangement Example

FIG. 24

The third arrangement example and the fourth arrangement example are examples of a case where signals transmitted by the communication terminals are OFDM signals.

Figure 24:
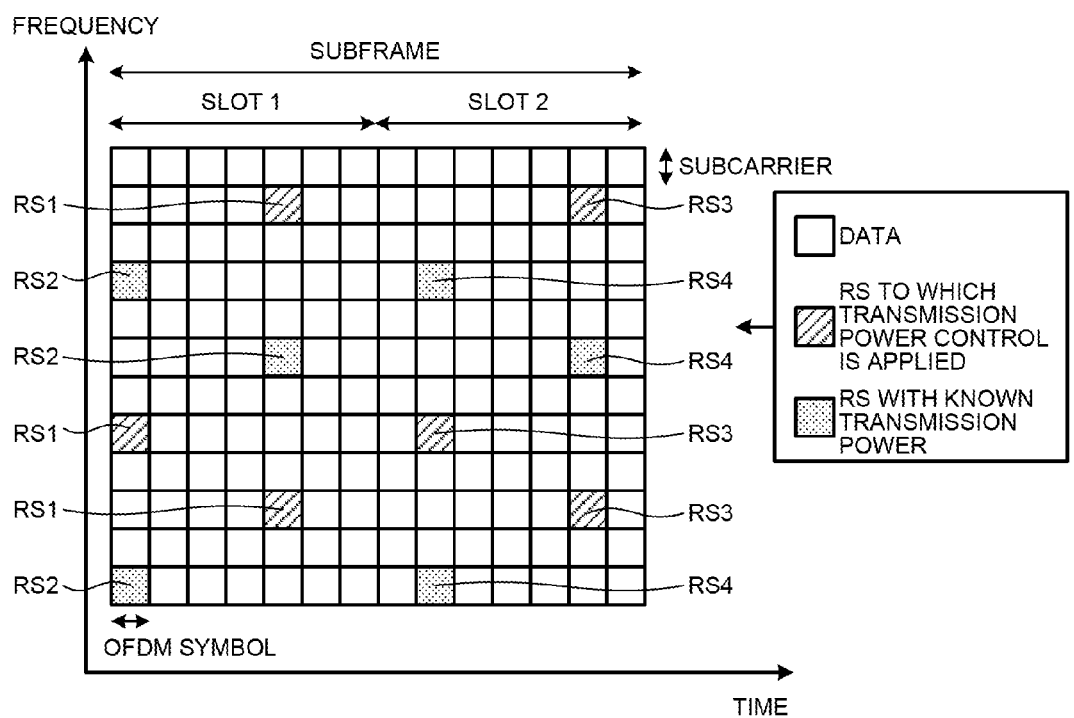
FIG. 24 is a diagram illustrating an arrangement example of the DM_RSs of the third embodiment.

In the third arrangement example, the transmission processing unit 13 arranges RS1s to RS4s, which are DM_RSs, as illustrated in FIG. 24. In FIG. 24, the RS1s and the RS3s are RSs to which the transmission power control is applied, that is, RSs that are controlled so as to reach the transmission power linked to the transmission power of the data, and the RS2s and the RS4s are RSs controlled so as to reach the known transmission power. Furthermore, one OFDM symbol includes subcarriers corresponding to the number of allocated resource blocks (RBs)×12 subcarriers (for example, if one RB is allocated, 12 subcarriers are included). Specifically, the transmission processing unit 13 arranges the RS1s to the RS4s in a distributed manner in a plurality of subcarrier components of a plurality of OFDM signals in one subframe. Furthermore, the transmission processing unit 13 arranges the RS1s to the RS4s at equal intervals or at approximately equal intervals in both of the frequency axis direction and the time axis direction.

Fourth Arrangement Example

FIG. 25

Figure 25:
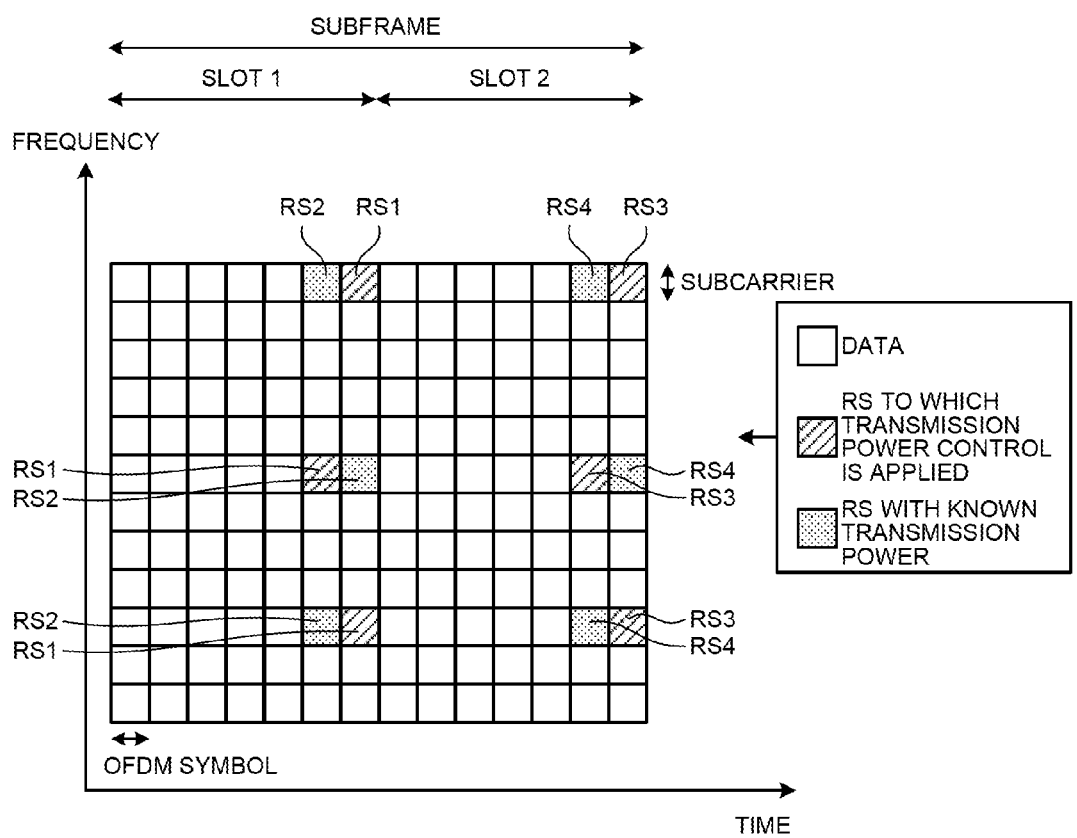
FIG. 25 is a diagram illustrating an arrangement example of the DM_RSs of the third embodiment.

In the fourth arrangement example, the transmission processing unit 13 arranges RS1s to RS4s, which are DM_RSs, as illustrated in FIG. 25. In FIG. 25, the RS1s and the RS3s are RSs to which the transmission power control is applied, that is, RSs that are controlled so as to reach the transmission power linked to the transmission power of the data, and the RS2s and the RS4s are RSs that are controlled so as to reach the known transmission power. Furthermore, one OFDM symbol includes subcarriers corresponding to the number of allocated resource blocks (RBs)×12 subcarriers (for example, if one RB is allocated, 12 subcarriers are included). Specifically, the transmission processing unit 13 arranges the RS1s to the RS4s in a distributed manner in a plurality of subcarrier components of a plurality of OFDM signals in one subframe. Furthermore, the transmission processing unit 13 arranges the RS1s and the RS2s in the subcarrier components that are adjacent to each other on the time axis and that have the same frequencies in the slot 1, and arranges the RS3s and the RS4s in the subcarrier components that are adjacent to each other on the time axis and that have the same frequencies in the slot 2.

Furthermore, if the DM_RSs are arranged as illustrated in FIG. 24 or FIG. 25, it is preferable that the normalizing unit 31 obtains a normalized RS2 in accordance with Expression (4) and obtains a normalized RS4 in accordance with Expression (11). Consequently, average power of the RS2 becomes the same as average power of the RS1, average power of the RS4 becomes the same as average power of the RS3, so that even when reception power changes due to a change in path loss or the like between the slot 1 and the slot 2, it is possible to perform normalization with accuracy.

As described above, in the third arrangement example and the fourth arrangement example, the DM_RSs with the known transmission power and the DM_RSs with the transmission power linked to the transmission power of the data are arranged in a distributed manner in a plurality of subcarriers of a plurality of OFDM symbols in one subframe.

With this configuration, when the transmission signals are the OFDM signals, and if the state of the propagation channel changes between the slots, it is possible to perform channel estimation in accordance with the change in the state of the propagation channel.

[d] Other Embodiments

Figure 26:
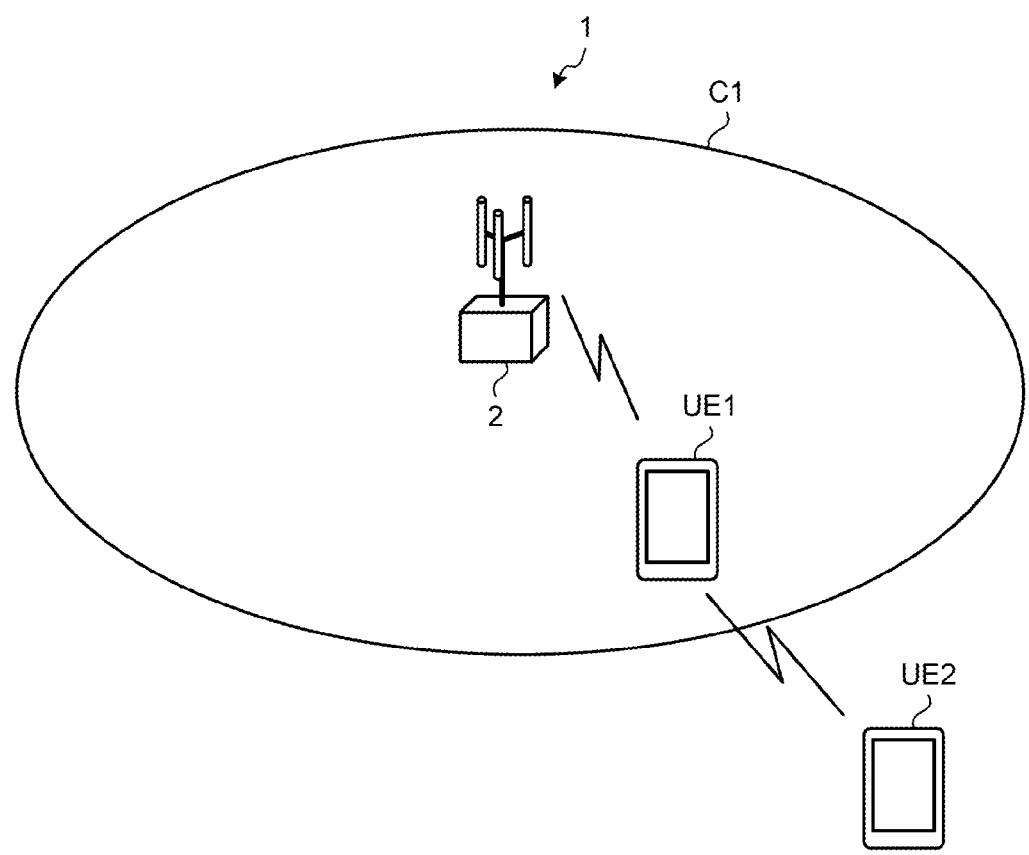
FIG. 26 is a diagram illustrating an example of a configuration of a communication system of another embodiment.
Figure 28:
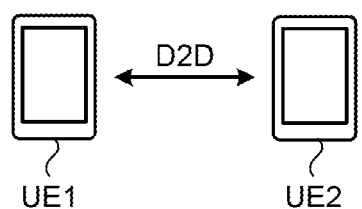
FIG. 28 is a diagram illustrating an example of a configuration of a communication system of still another embodiment.

[1] FIG. 26, FIG. 27, and FIG. 28 are diagrams illustrating examples of communication systems of other embodiments.

FIG. 26 illustrates a case in which the communication terminal UE2 is located outside the cell C1. In FIG. 26, for execution of the D2D communication, the base station 2 exchanges various kinds of control information with the communication terminal UE1. In contrast, the base station 2 and the communication terminal UE2 exchange various kinds of control information relayed by the communication terminal UE1. For example, the base station 2 that has determined the known transmission power of a DM_RS transmits a notification of the known transmission power to the communication terminal UE1, and the communication terminal UE1 that has received the notification transfers the notification to the communication terminal UE2.

FIG. 27 illustrates a case in which communication terminals UE1, UE2, UE3, . . . are located outside the cell of a base station or the base station has lost the function because of collapse due to a large-scale disaster etc., power outage, or the like (that is, Out-of-Network Coverage), and in which a plurality of communication terminals constitute clusters CL1 and CL2 together with neighboring communication terminals. In FIG. 27, each of the communication terminals UE3 and UE6 is a communication terminal serving as a cluster head. In FIG. 27, for execution of the D2D communication between the communication terminal UE1 and the communication terminal UE2, the communication terminal UE3 as the cluster head exchanges various kinds of control information with the communication terminals UE1 and UE2. Further, for execution of the D2D communication between the communication terminal UE4 and the communication terminal UE5, the communication terminal UE6 as the cluster head exchanges various kinds of control information with the communication terminals UE4 and UE5. For example, the communication terminal UE3 determines the known transmission power of a DM_RS and notifies the communication terminals UE1 and UE2 of the known transmission power.

FIG. 28 illustrates a case in which both of the communication terminals UE1 and UE2 are located outside the cell. In this case, the communication terminals UE1 and UE2 use the known transmission power, the maximum transmission power, and the initial transmission power that are determined in advance.

Figure 29:
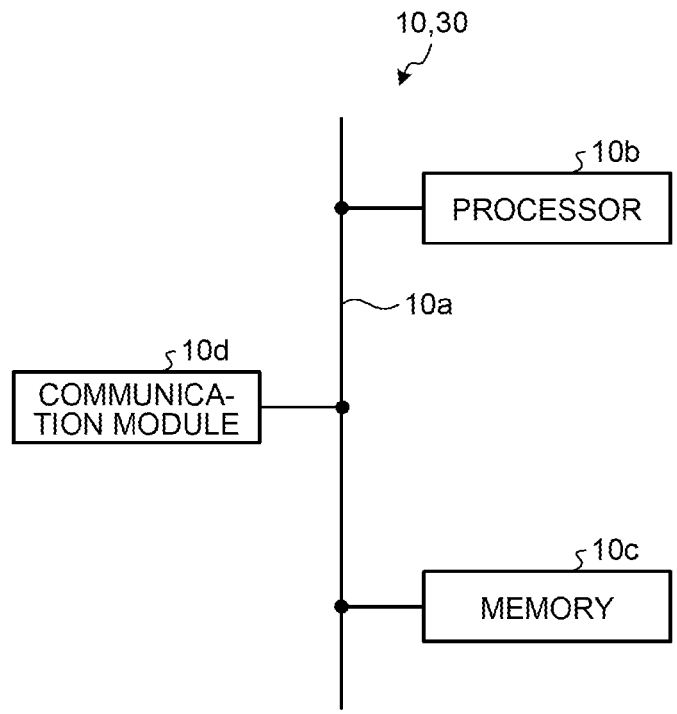
FIG. 29 is a diagram illustrating a hardware configuration example of the communication terminal.

[2] The communication terminals 10 and 30 of the above-described embodiments are implemented by a hardware configuration as described below. FIG. 29 is a diagram illustrating a hardware configuration example of the communication terminal. As illustrated in FIG. 29, each of the communication terminals 10 and 30 includes, as hardware components, a bus 10a, a processor 10b, a memory 10c, and a communication module 10d. The processor 10b, the memory 10c, and the communication module 10d are connected to one another via the bus 10a. The processor 10b is, for example, a Central Processing Unit (CPU), a Digital Signal Processor (DSP), a Field Programmable Gate Array (FPGA), or the like. Furthermore, each of the communication terminals 10 and 30 may include a Large Scale Integrated circuit (LSI) including the processor 10b and peripheral circuits. The memory 10c is, for example a random access memory (RAM), such as a synchronous dynamic random access memory (SDRAM), a read only memory (ROM), a flash memory, or the like. The wireless transmission unit 15, the wireless reception unit 17, and the antennas A1 and A2 are implemented by the communication module 10d. The transmission power control unit 11, the transmission processing unit 13, the reception processing unit 19, the path loss estimating unit 21, the channel estimating unit 23, the demodulating unit 25, the communication control unit 27, and the normalizing unit 31 are implemented by the processor 10b.

[3] The processes performed by the transmission power control unit 11, the transmission processing unit 13, the reception processing unit 19, the path loss estimating unit 21, the channel estimating unit 23, the demodulating unit 25, the communication control unit 27, and the normalizing unit 31 as described above may be implemented by causing the processor 10b to execute a program corresponding to each of the processes. For example, it may be possible to store, in the memory 10c, programs corresponding to the respective processes performed by the transmission power control unit 11, the transmission processing unit 13, the reception processing unit 19, the path loss estimating unit 21, the channel estimating unit 23, the demodulating unit 25, the communication control unit 27, and the normalizing unit 31 as described above, and cause the processor 10b to read the programs from the memory 10c and execute the programs.

Figure 30:
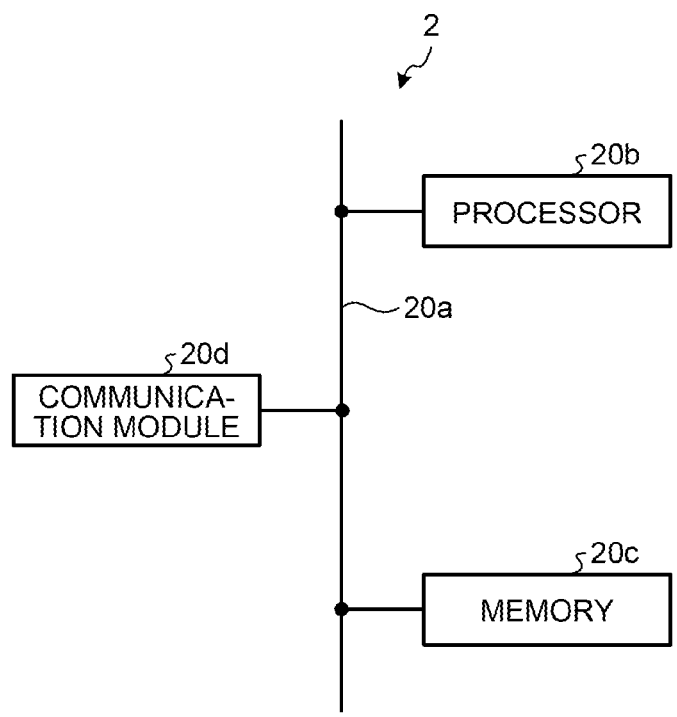
FIG. 30 is a diagram illustrating a hardware configuration example of the base station.

[4] The base station 2 of the above-described embodiments is implemented by a hardware configuration as described below. FIG. 30 is a diagram illustrating a hardware configuration example of the base station. As illustrated in FIG. 30, the base station 2 includes a bus 20a, a processor 20b, a memory 20c, and a communication module 20d. The processor 20b, the memory 20c, and the communication module 20d are connected to one another via the bus 20a. The processor 20b is, for example, a CPU, a DSP, an FPGA, or the like. Furthermore, the base station 2 may include an LSI including the processor 20b and peripheral circuits. The memory 20c is, for example, a RAM, such as an SDRAM, a ROM, a memory, or the like. The wireless reception unit 41, the wireless transmission unit 48, and the antennas are implemented by the communication module 20d. The reception processing unit 42, the demodulating unit 43, the path loss estimating unit 44, the control unit 45, the transmission data generating unit 46, and the transmission processing unit 47 are implemented by the processor 20b.

[5] The processes performed by the reception processing unit 42, the demodulating unit 43, the path loss estimating unit 44, the control unit 45, the transmission data generating unit 46, and the transmission processing unit 47 as described above may be implemented by causing the processor 20b to execute a program corresponding to each of the processes. For example, it may be possible to store, in the memory 20c, programs corresponding to the respective processes performed by the reception processing unit 42, the demodulating unit 43, the path loss estimating unit 44, the control unit 45, the transmission data generating unit 46, and the transmission processing unit 47 as described above, and cause the processor 20b to read the programs from the memory 20c and execute the programs.

[6] In the above-described embodiments, an example has been described in which the D2D communication is performed in accordance with the LTE standard specification.

However, the communication standard to which the disclosed technology is applicable is not limited to the LTE.

According to an embodiment of the disclosed technology, it is possible to control transmission power in accordance with a change in path loss in the D2D communication without increasing overhead.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
   a first communication terminal; and
   a second communication terminal that performs direct communication with the first communication terminal, wherein
   the first communication terminal:
      controls transmission power of a first reference signal which is a partial reference signal among a plurality of reference signals so as to reach known transmission power, the plurality of reference signals being transmitted with first data and used for demodulating the first data,
      controls transmission power of a second reference signal which is another reference signal other than the first reference signal among the plurality of reference signals so as to reach transmission power linked to transmission power of the first data, and
      transmits the plurality of reference signals subjected to transmission power control to the second communication terminal, and
   the second communication terminal:
      receives the plurality of reference signals,
      estimates path loss between the first communication terminal and the second communication terminal by using the first reference signal among the plurality of reference signals,
      controls transmission power of second data based on the path loss, and
      transmits the second data subjected to transmission power control to the first communication terminal.

2. The communication system according to claim 1, wherein
   the first reference signal is included in one of two slots included in a subframe, and
   the second reference signal is included in the other one of the two slots in the subframe.

3. The communication system according to claim 1, wherein
   the first reference signal is arranged in first subcarrier components that are arranged at regular intervals among subcarrier components of one symbol, and
   the second reference signal is arranged in second subcarrier components other than the first subcarrier components among the subcarrier components.

4. The communication system according to claim 1, wherein the first reference signal and the second reference signal are arranged in a distributed manner in a plurality of subcarrier components in a plurality of OFDM symbols in one subframe.

5. The communication system according to claim 1, wherein the second communication terminal normalizes the first reference signal by using one of average reception power of the first reference signal and transmission power of the first reference signal, and performs channel estimation by using the normalized first reference signal.

6. The communication system according to claim 1, wherein the first communication terminal and the second communication terminal receive an instruction on the known transmission power from a base station before starting the direct communication.

7. A communication terminal comprising:
   a control unit that controls transmission power of a first reference signal which is a partial reference signal among a plurality of reference signals so as to reach known transmission power, the plurality of reference signals being transmitted with data and used for demodulating the data, and controls transmission power of a second reference signal which is another reference signal other than the first reference signal among the plurality of reference signals so as to reach transmission power linked to transmission power of the data; and
   a transmitting unit that transmits the plurality of reference signals subjected to transmission power control to a different communication terminal that performs direct communication with the communication terminal.

8. A communication terminal comprising:
   a receiving unit that receives a plurality of references signals that are transmitted with first data and that are used for demodulating the first data, from a different communication terminal that performs direct communication with the communication terminal;
   a path loss estimating unit that estimates path loss between the different communication terminal and the communication terminal by using a first reference signal which is a partial reference signal that is controlled so as to reach known transmission power by the different communication terminal among the plurality of the reference signals;
   a control unit that controls transmission power of second data based on the path loss; and
   a transmitting unit that transmits the second data subjected to transmission power control to the different communication terminal.

* * * * *